United States Patent [19]

Maeda et al.

[11] Patent Number: 5,657,308
[45] Date of Patent: Aug. 12, 1997

[54] APPARATUS FOR RECORDING/REPRODUCING INFORMATION DATA IN TWO DIMENSIONAL FORMAT

[75] Inventors: Takeshi Maeda, Kokubunji; Atsushi Saito, Ichikawa; Hiroshi Ide, Kodaira, all of Japan

[73] Assignee: Hitachi, Ltd., Tokyo, Japan

[21] Appl. No.: 557,319

[22] Filed: Nov. 14, 1995

Related U.S. Application Data

[62] Division of Ser. No. 285,003, Aug. 2, 1994, Pat. No. 5,491,678, which is a continuation of Ser. No. 704,227, May 22, 1991, abandoned.

[30] Foreign Application Priority Data

May 25, 1990  [JP]  Japan ..................... 2-133823

[51] Int. Cl.$^6$ ..................................... G11B 7/00
[52] U.S. Cl. ................... 369/121; 369/120; 369/275.4
[58] Field of Search ................. 369/275.3, 275.4, 369/44.26, 44.37, 44.38, 100, 111, 59, 120, 121; 235/454, 456

[56] References Cited

U.S. PATENT DOCUMENTS

| | | | |
|---|---|---|---|
| 4,853,920 | 8/1989 | Hosoya et al. | 235/456 X |
| 4,969,137 | 11/1990 | Sugiyama et al. | 369/32 |
| 5,008,521 | 4/1991 | Ohki et al. | 235/456 X |
| 5,056,080 | 10/1991 | Russell | 369/44.26 X |
| 5,093,822 | 3/1992 | Kugiya et al. | |
| 5,241,166 | 8/1993 | Chandler | 235/456 X |
| 5,410,531 | 4/1995 | Tsujioka . | |

FOREIGN PATENT DOCUMENTS

| | | |
|---|---|---|
| 29 09 770 A1 | 9/1979 | Germany . |
| 40 06 275 A1 | 9/1990 | Germany . |
| 0257921 | 10/1988 | Japan . |
| 5-250679 | 9/1993 | Japan . |

OTHER PUBLICATIONS

"Optical Components Replicated Optics", Philips, Product Specification, Sep. 1994, pp. 1–28.

*Primary Examiner*—Thang V. Tran
*Attorney, Agent, or Firm*—Antonelli, Terry, Stout & Kraus, LLP.

[57] ABSTRACT

In an information recording/reproducing apparatus constructed of: a buffer for storing therein consecutive recording data in a unit of two dimensional conversion; a coding device for converting the consecutive recording data into a two-dimensional data arrangement arranged by "n" lines and "m" columns corresponding to said unit of data; a recording device for subdividing said two-dimensional data arrangement arranged by "n" lines and "m" columns so as to be read out, and for controlling "m" pieces of light sources in accordance with these data series; and an optical apparatus for converging luminous fluxes from said "m" pieces of light sources so as to form "m" pieces of spots on a disk plane, the recording data is recorded on the disk plane as an optically distringuishable pit group having two-dimensionally extended areas arranged by "n" lines and "m" columns. During a reproducing operation, the reflected light is detected by "m" pieces of detectors; "m" columns of one-dimensional data series are generated from the reflected light detected by these detectors in a generator; and also consecutive data is reproduced from the two dimensional data arranged by "n" lines and "m" columns in a decoder.

2 Claims, 26 Drawing Sheets

FIG. 4

| DATA TO BE RECORDED | CODING LIST CONVERTED DATA | | ARRANGEMENT CONVERSION | |
|---|---|---|---|---|
| | | | FIRST ARRANGEMENT | SECOND ARRANGEMENT |
| 0 0 0 0 | 0 0 | 0 0 | 0 0 | 0 0 |
| 0 0 0 1 | 1 0 | 0 0 | 1 0 | 0 0 |
| 0 0 1 0 | 0 0 | 1 0 | 0 0 | 1 0 |
| 0 0 1 1 | 0 1 | 0 0 | 0 1 | 0 0 |
| 0 1 0 0 | 0 0 | 0 1 | 0 0 | 0 1 |
| 0 1 0 1 | 1 1 | 0 0 | 1 1 | 0 0 |
| 0 1 1 0 | 0 0 | 1 1 | 0 0 | 1 1 |
| 1 1 1 0 | 0 1 | 1 1 | 0 1 | 1 1 |
| 1 1 0 1 | 1 1 | 0 1 | 1 1 | 0 1 |
| 1 1 0 0 | 1 1 | 1 0 | 1 1 | 1 0 |
| 1 0 1 1 | 1 0 | 1 1 | 1 0 | 1 1 |
| 1 0 1 0 | 1 0 | 1 0 | 1 0 | 1 0 |
| 1 0 0 1 | 1 0 | 0 1 | 1 0 | 0 1 |
| 1 1 1 1 | 1 1 | 1 1 | 1 1 | 1 1 |

F I G. 10A
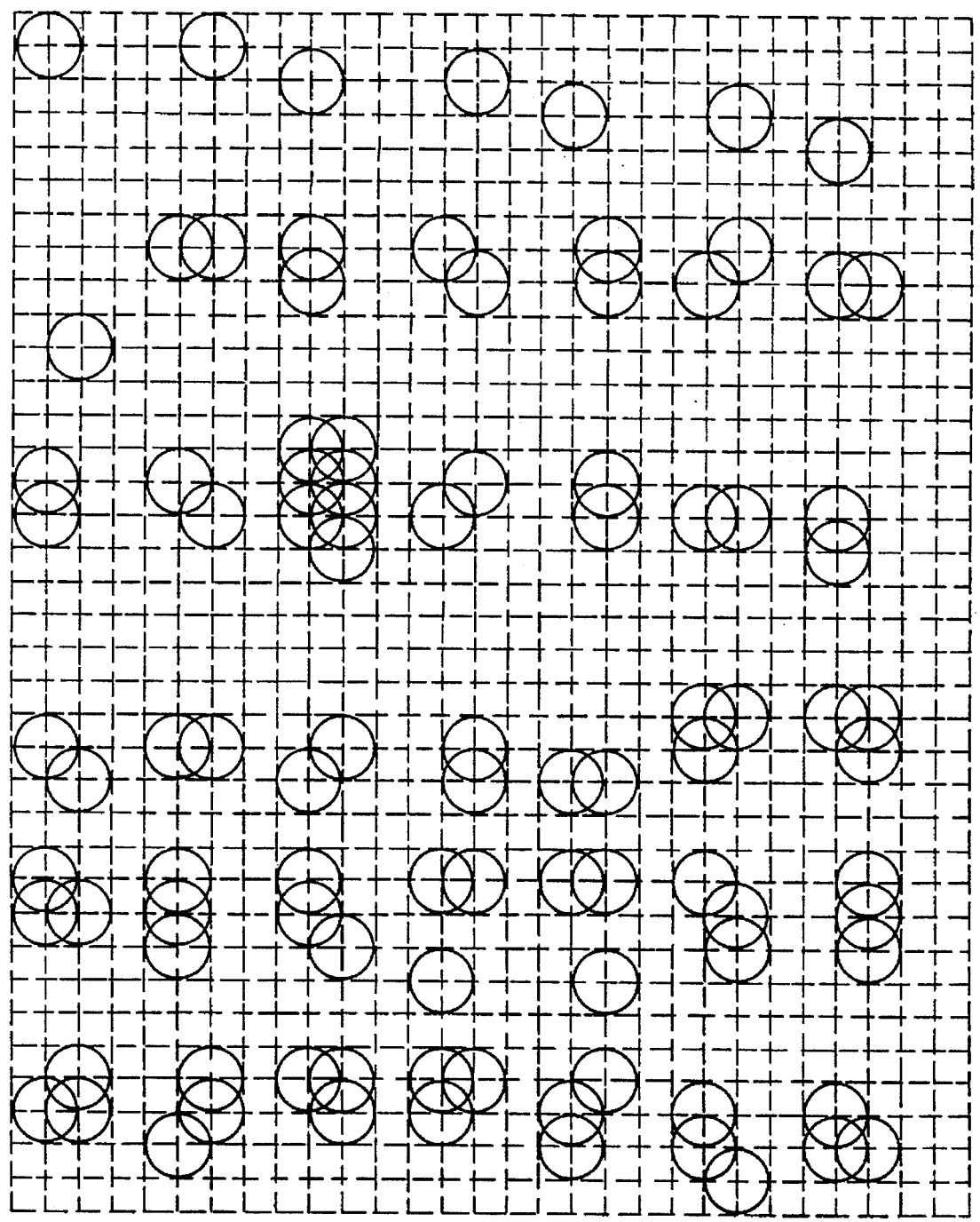

F I G. 10C
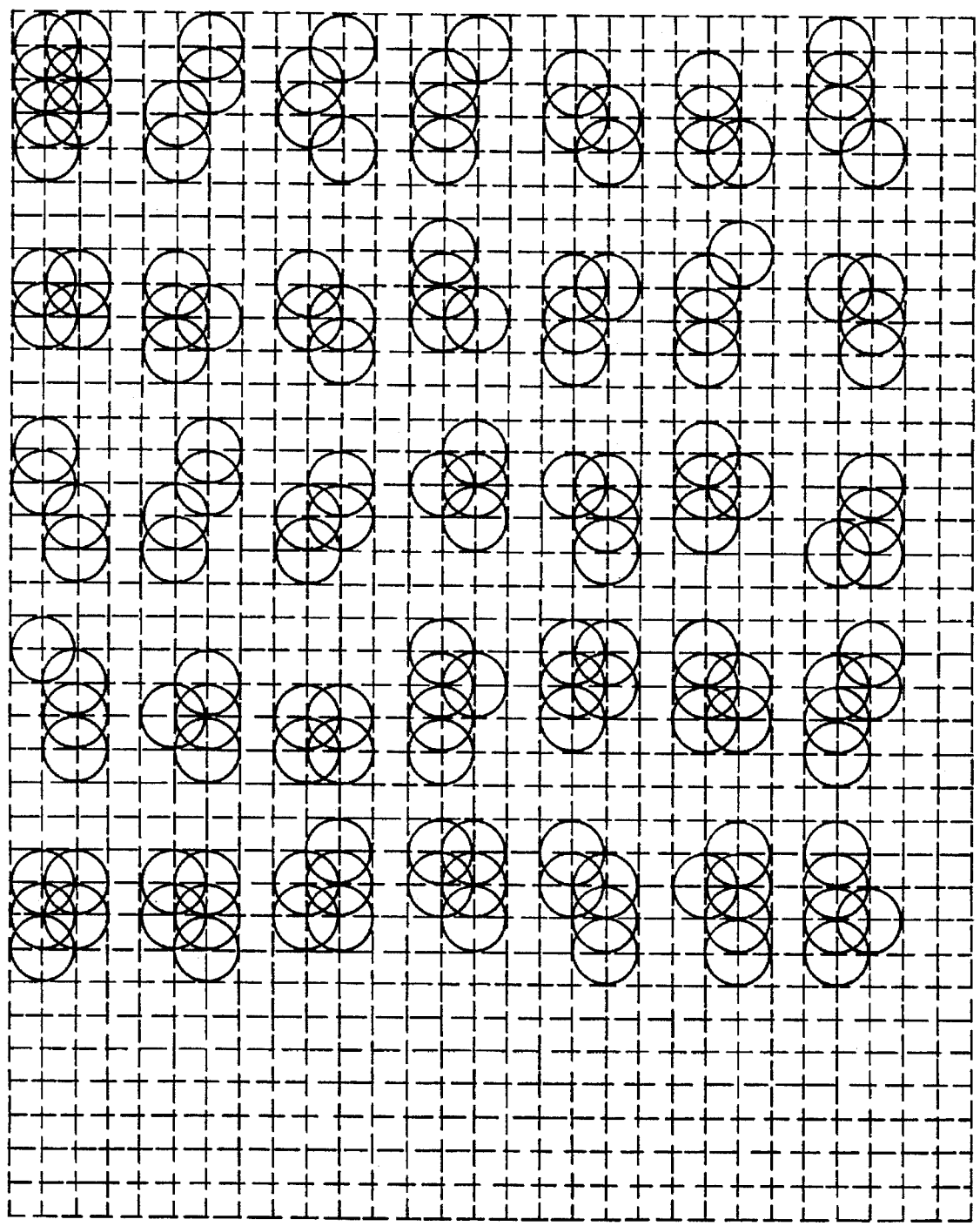

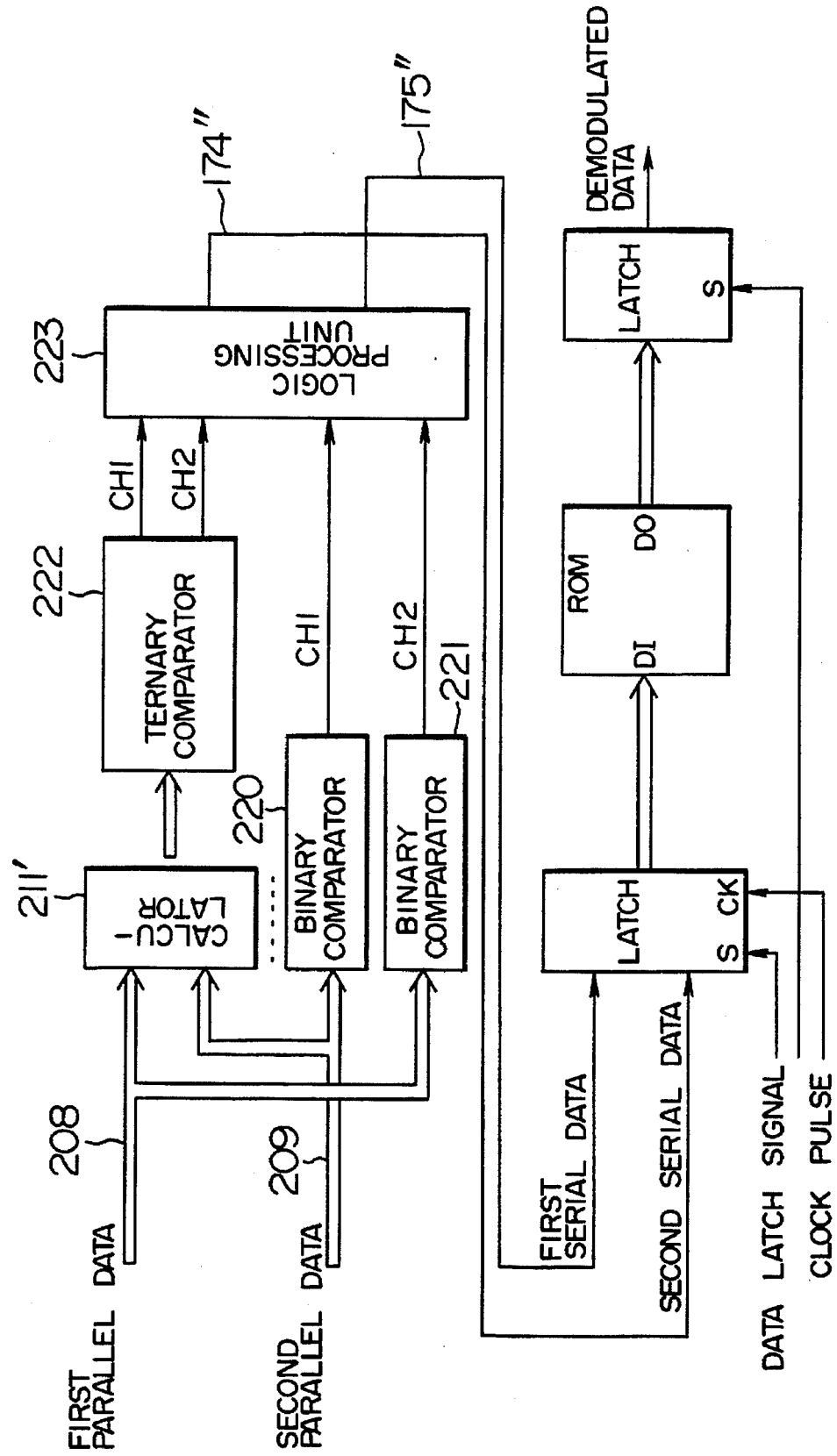
F I G. 13A

F I G. 14
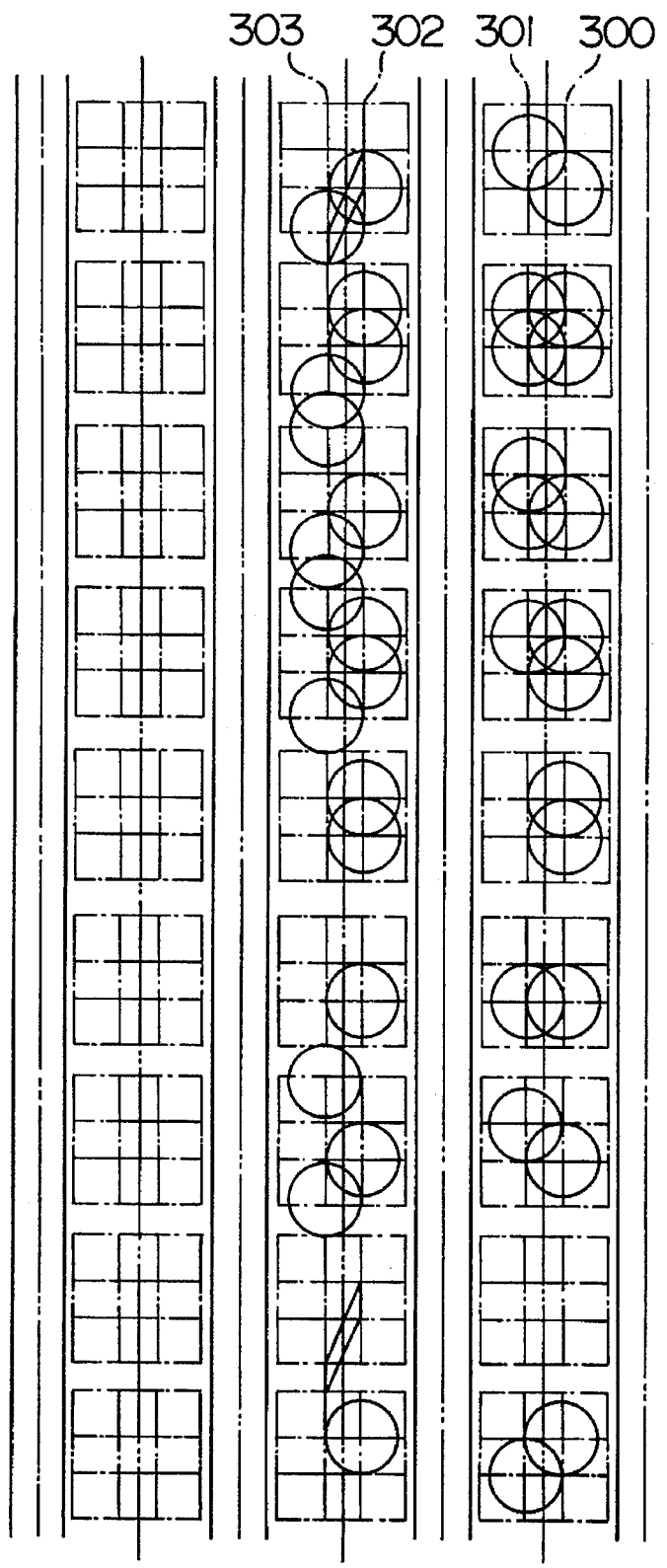

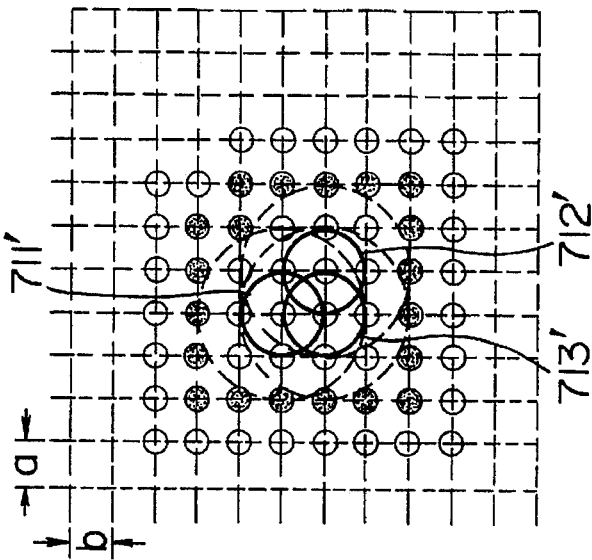
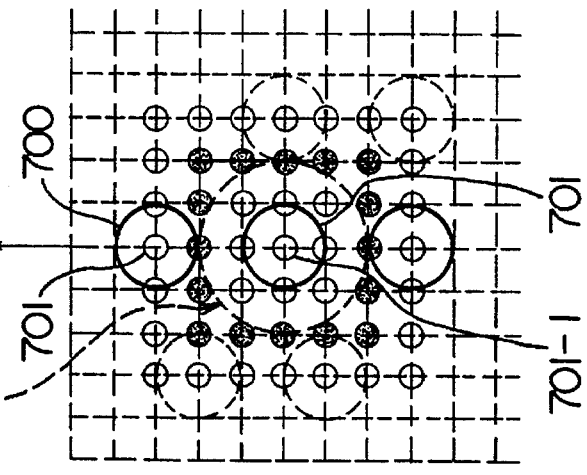

APPARATUS FOR RECORDING/ REPRODUCING INFORMATION DATA IN TWO DIMENSIONAL FORMAT

This application is division of application Ser. No. 08/285,003, filed Aug. 2, 1994, now U.S. Pat. No. 5,491, 678, which is a continuation of application Ser. No. 07/704, 227, filed May 22, 1991, now abandoned.

BACKGROUND OF THE INVENTION

The present invention relates to an optical information processing apparatus, and more specifically, relates to an information recording/reproducing apparatus and a method such as an optical disk.

Up to the present practical use stage since the basic recording/reproducing system has been proposed, in the conventional optical disk, data are recorded in a time sequential mode on the concentric track thereof along the circumferential direction, which is similar to the conventional magnetic recording apparatus with utilizing magnetic force. The intervals of the adjoining tracks are set in order that data interference (referred to as a "crosstalk") among the respective tracks may be eliminated and thus no correlation of the data is present between the adjoining tracks.

There are conventional techniques for increasing the recording densities of the optical disks as described in, for instance, JP-A-2-53223.

Higher recording densities are continuously required for the information recording/reproducing apparatuses. To this end, in accordance with the conventional magnetic recording systems, the track intervals and the bit densities in the circumferential direction have been separately improved, whereby the recording plane densities could be increased. Similarly, a similar improving approach has been taken in the optical disk.

Since the resolution in the circumferential direction and the radial direction with respect to the conventional magnetic heads is asymmetrical with each other, there is a considerable difference between the track density and the bit density, e.g., approximately 10 times difference therebetween. However, since the spots used for the data recording/ reproducing operations represent a isotropic characteristic in the optical disk, the track density is substantially equal to the line density. Nevertheless, even when the shape of the light spot are isotropically made small in order to increase the densities, although the line density may be improved, the track intervals could not be improved, as compared with the improvement in the line density. This is because there are many factors of the spot positional variations along the radial direction. As a result, the amount of variations becomes large and it is difficult to narrow the track intervals.

SUMMARY OF THE INVENTION

It is an object of the present invention to achieve higher densities of information recorded on an optical disk.

To achieve this object, the isotropic characteristic of the optical disk which is superior to the conventional recording apparatus is actively utilized.

To achieve the above-described object, an information recording/reproducing apparatus according to the present invention, comprises:

buffer means for storing therein consecutive recording data in a unit of two-dimensionally conversion;

converting means for converting said consecutive recording data into nxm two-dimensional data arrangements corresponding to said unit of data;

recording means having m pieces of light sources, for subdividing said nxm two-dimensional data arrangements into m columns of one-dimensional data columns so as to be read out; and for controlling said m pieces of light sources in accordance with said data columns; and optical means for converging luminous fluxes from said m pieces of light sources and for forming m pieces of spots n a disk plane;

said recording data are recorded on said disk plane as an optically distinguishable information identifier group having nxm two-dimensional extended areas.

Also, an information recording/reproducing apparatus, according to the present invention, for reproducing data which have been recorded by way of a recording method for converting consecutive data into data having mxn two-dimensionally extended areas, and for recording said converted data on an optical disk as an optically distinguishable pit group, comprises:

m pieces of light sources;

optical means for converting luminous fluxes from said "m" pieces of light sources and for forming "m" pieces of spots on a plane of the optical disk;

positioning means for positioning said "m" pieces of spots onto said pit group on the disk plane;

"m" pieces of detecting means for detecting light reflected from said pit group corresponding to each of the spots;

generating means for generating "m" columns of one-dimensional data series from the reflection light detected by the respective detecting means, and also for generating nxm two-dimensional data by combining "n" pieces of said one-dimensional data series; and demodulating means for demodulating the consecutive data from said nxm two dimensional data.

An information recording/reproducing method, according to the present invention, comprises the steps of:

coding recorded information into two-dimensional information;

converting said two-dimensional information into a one-dimensional information arrangement;

modulating a plurality of laser light sources with employment of said information arrangement so as to record two dimensional codes on a disk plane;

reproducing said two dimensional information with employment of a plurality of laser light sources;

photo-electrically converting the reproduced signal;

detecting a one-dimensionally arranged signal from the photo-electrically converted signal; and decoding two dimensional information by employing these signals.

Furthermore, an information recording/reproducing method, according to the present invention, comprises the steps of:

storing consecutive recording data in a unit of two dimensional conversion;

coding said consecutive data to nxm two-dimensional data series;

subdividing said nxm two-dimensional data series into "m" columns of one-dimensional data series so as to be read out, and controlling "m" pieces of light sources in accordance with these data series;

converging luminous fluxes from said "m" pieces of light sources so as to form "m" pieces of spots on a disk plane;

recording on said disk plane, data to be recorded thereon as an optically distinguishable pit group having nxm two-dimensionally extended areas;

positioning said "m" pieces of spots on said pit group on the disk plane;

detecting light reflected from said pit group corresponding to each of the spots;

generating "m" columns of one-dimensional data series from the reflected light detected by said detecting steps and combining with each other "n" pieces of said data so as to generate nxm two-dimensional data; and decoding consecutive data from said nxm two-dimensional data.

In accordance with the present invention, the data to be recorded is subdivided and the subdivided data are coded in order to correspond to the two dimensional arrangement, but not to correspond to the one dimensional arrangement effected as in the conventional coding operation.

During the recording operation, the two dimensional arrangement is subdivided into a plurality of one dimensional arrangements. A plurality of light sources corresponding to the two dimensional arrangement are employed so as to converge the luminous fluxes from these light sources onto the disk plane, whereby a plurality of spots are formed. In response to the respective one-dimensionally arranged data, the respective light sources are modulated so that the optically distinguishable pit group having the two-dimensionally extended areas in the radial and circumferential directions is recorded on the disk plane.

During the reproducing operation, the luminous fluxes from a plurality of light sources are converged and a plurality of spots are formed on the disk plane, the above-described spot group is positioned on the optically distinguishable pit group having the two-dimensionally extended areas, and ten either the reflection light or the transmission light which has been modulated by the above pit group is detected, depending upon the respective spots. The one dimensional data arrangement corresponding to the trials of the respective spots is produced with employment of the detected time sequential signals, and also one set of data corresponding to the set of plural one-dimensional arrangements is decoded, so that the information recorded on the disk is read out therefrom.

In accordance with the present invention, since the data are recorded by utilizing a plurality of spots within one time, the amount of positional variations for the spots in the radial direction among the respective one-dimensional arrangements may be reduced. Also, even when the intervals among the one-dimensionally arranged data are narrowed, the data may be surely detected by the two dimensional arrangement, taking account of the signal process during the detecting (reproducing) operation.

BRIEF DESCRIPTION OF THE DRAWINGS

These and other objects and advantages of the present invention will become apparent by reference to the following description and accompanying drawings wherein:

FIG. 4 is a coding list for forming a two dimensional arrangement;

FIGS. 10A to 10D are explanatory diagrams for representing two dimensional arrangements corresponding to 7-bit recording data;

FIGS. 13A and 13B are schematic block diagrams of another reproduction processing system different from that of FIG. 12;

FIG. 14 is an explanatory diagram for showing a pit arrangement to reduce crosstalk;

FIGS. 18A, 18B and 18C illustrate rules of coding operations employed in the preferred embodiments;

DESCRIPTION OF THE PREFERRED EMBODIMENTS

Figure 1:
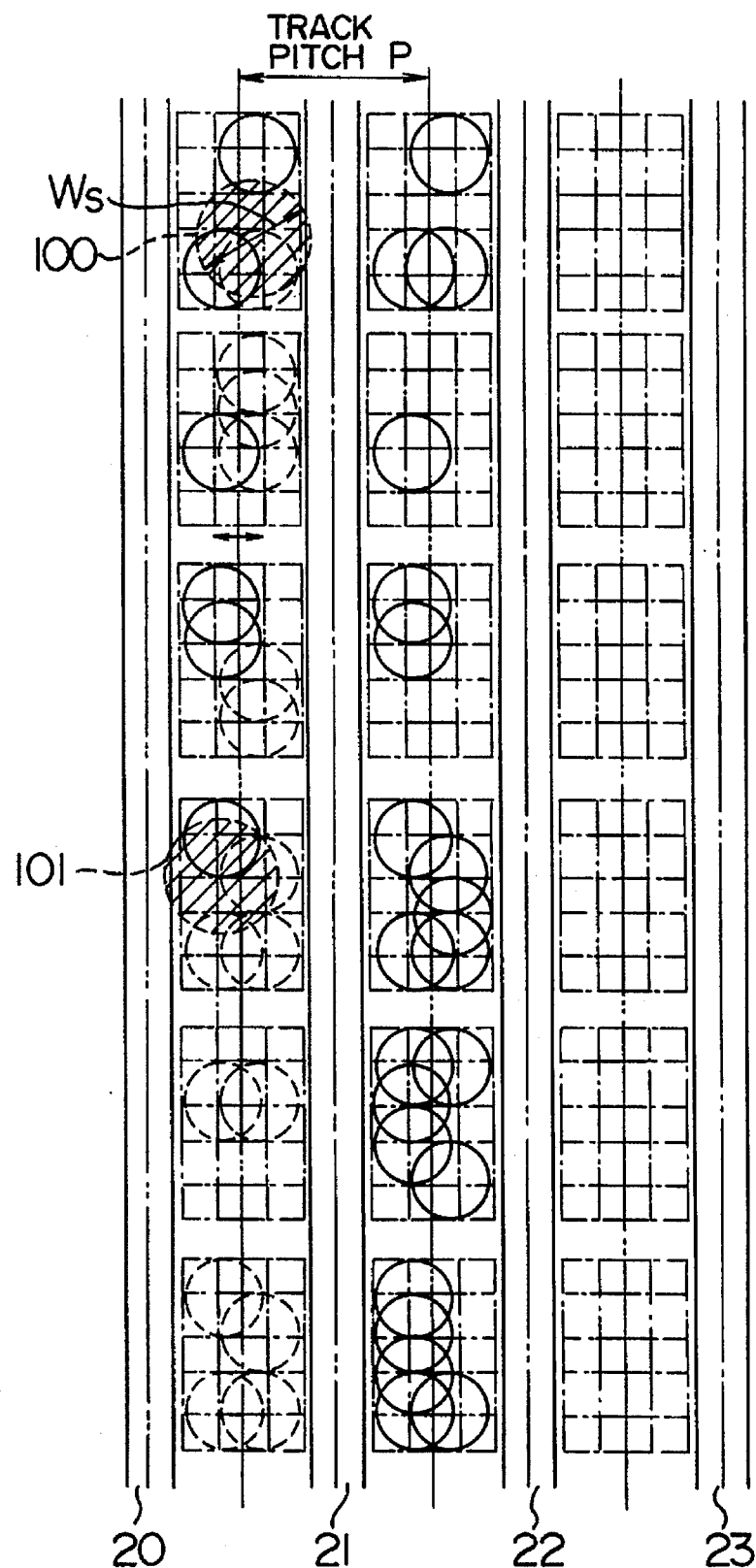
FIG. 1 is an explanatory diagram for showing two-dimensionally arranged pit groups on an optical disk according to one embodiment of the present invention.
Figure 21:
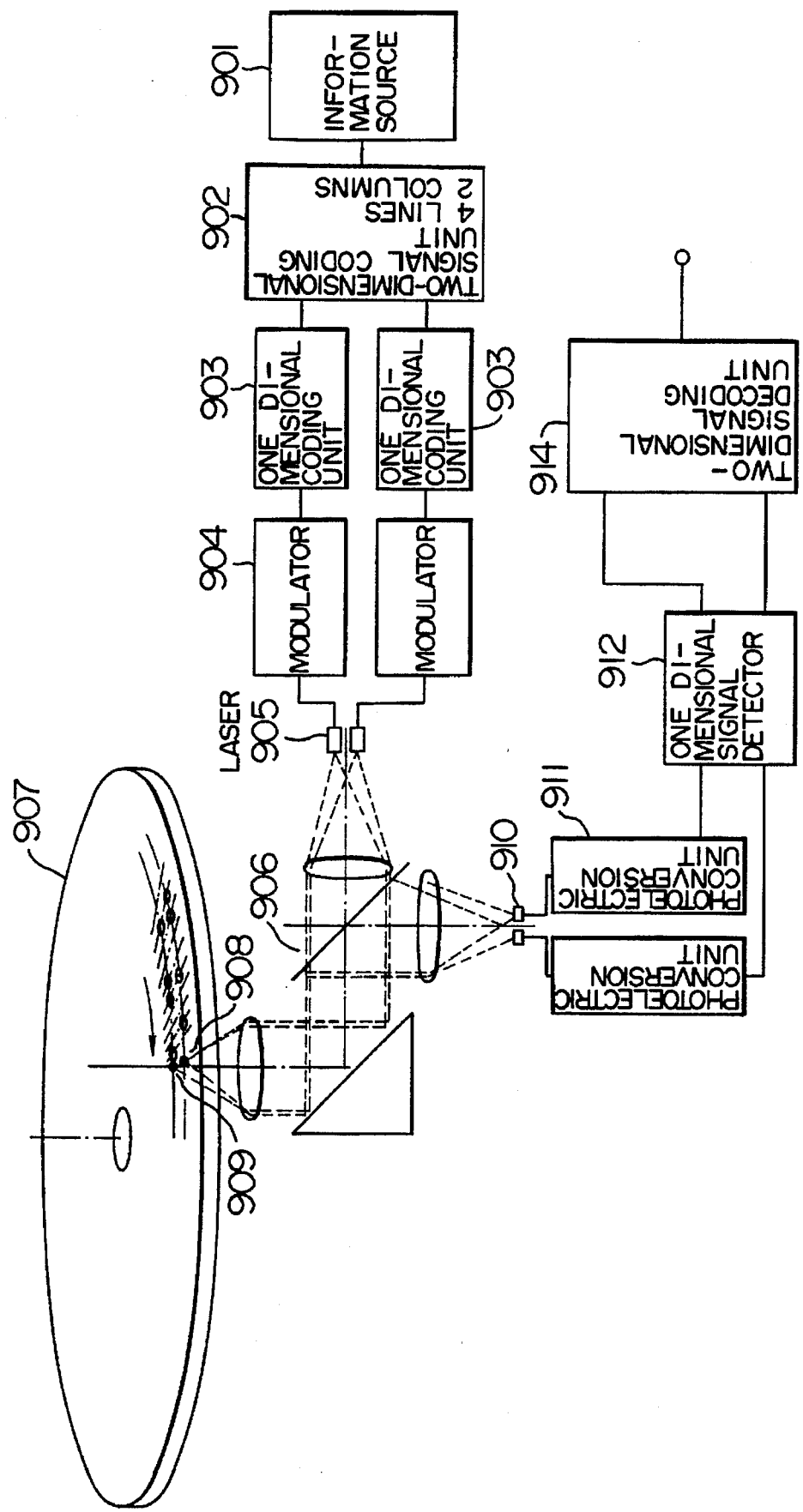

Referring now FIGS. 1 and 21, an optical information recording/reproducing system of the present invention will be summarized. As shown in FIG. 1, data to be recorded are converted in two dimensional 4×2 data and are recorded under 4-line/2-column pits state in this preferred embodiment.

In accordance with this preferred embodiment, serial (consecutive) recording information 901 are subdivided in a unit of 8 (4×2) during a recording operation; this information is coded as a two-dimensional arrangement of 4 lines and 2 columns (902); this information is further converted this information is further converted into a one-dimensional information arrangement in which the 4-line/2-column arrangement is handled as one column and then read (903); a laser 905 is modulated based on this one-dimensional information arrangement (904); and furthermore the laser light is converged at a predetermined position by an optical system 906 so that pits 908 and 909 are formed in two columns on an optical disk.

During the reproducing operation, the laser light emitted from the laser 905 is collected by an optical system 906 to the pits; light reflected from the pits is received by a light receiver 910, and photoelectric-converted (911) into a corresponding signal; a one-dimensional arrangement signal is detected from this photoelectric-converted signal (912); and a two-dimensional code is obtained from this detection signal and then decoded so as to reproduce consecutive information (914).

A more concrete arrangement of the present invention will now be described.

Figure 2:
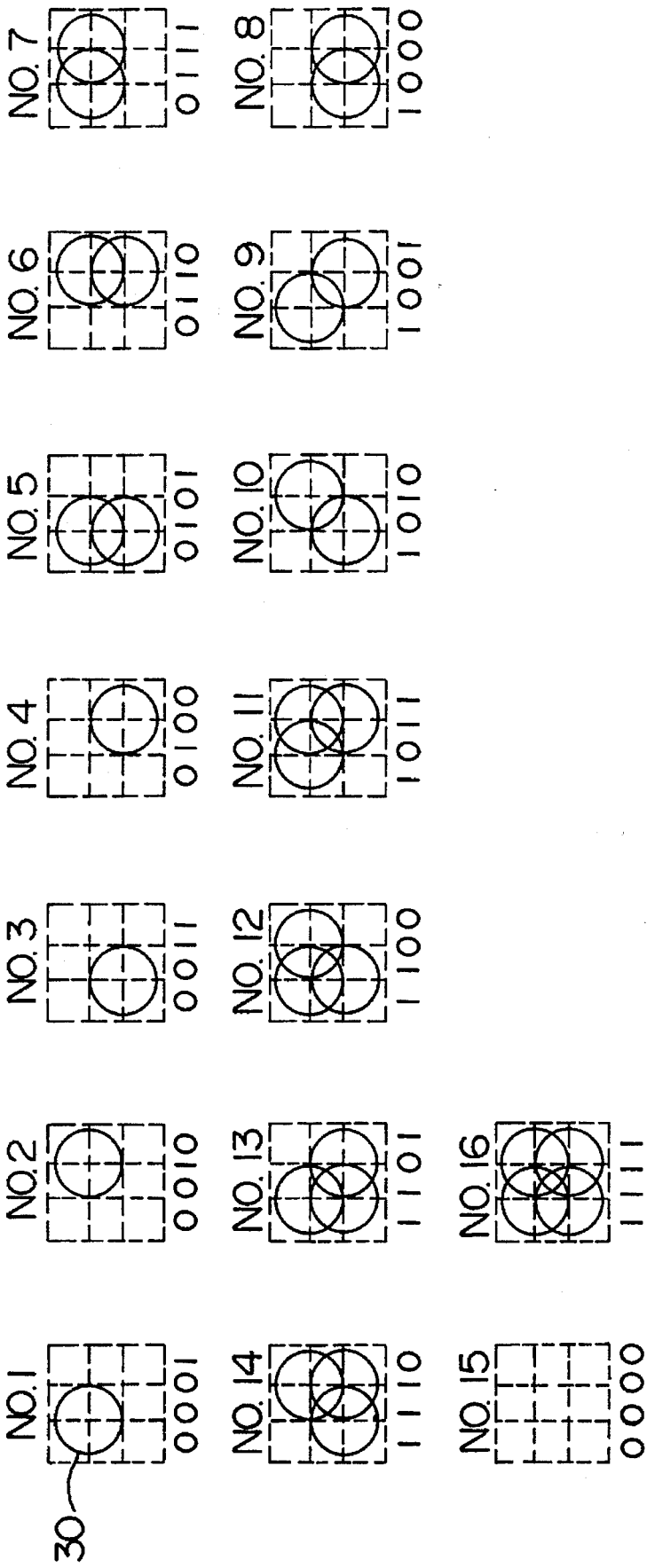
FIG. 2 is an explanatory diagram for representing two-dimensionally arranged pit groups according to the present invention.

In FIG. 2, there is shown a basic coding pattern of a pit group which is formed on a disk plane in accordance with the present invention and is optically discriminatable, as one preferred embodiment. For the sake of explanation, a coding pattern constructed of 2 lines and 2 column will now be described as a first example. As shown in FIG. 2, a grid constructed of 4 vertical lines and 4 horizontal lines is handled as one "block". Data is represented in such a manner that whether or not a round hole pit 30 is present at four grid points (i.e., points where the grids intersect with each other). With such an arrangement, since there are four grid points within 1 block the possible data arrangements become $2^4$, namely 4-bit data may be expressed. It should be noted that examples corresponding to the recording data are shown under the respective figures. The two-dimensional coding according to this preferred embodiment implies that the recording data correspond to the patterns arranged in a plane, as represented in FIG. 2.

Figure 3:
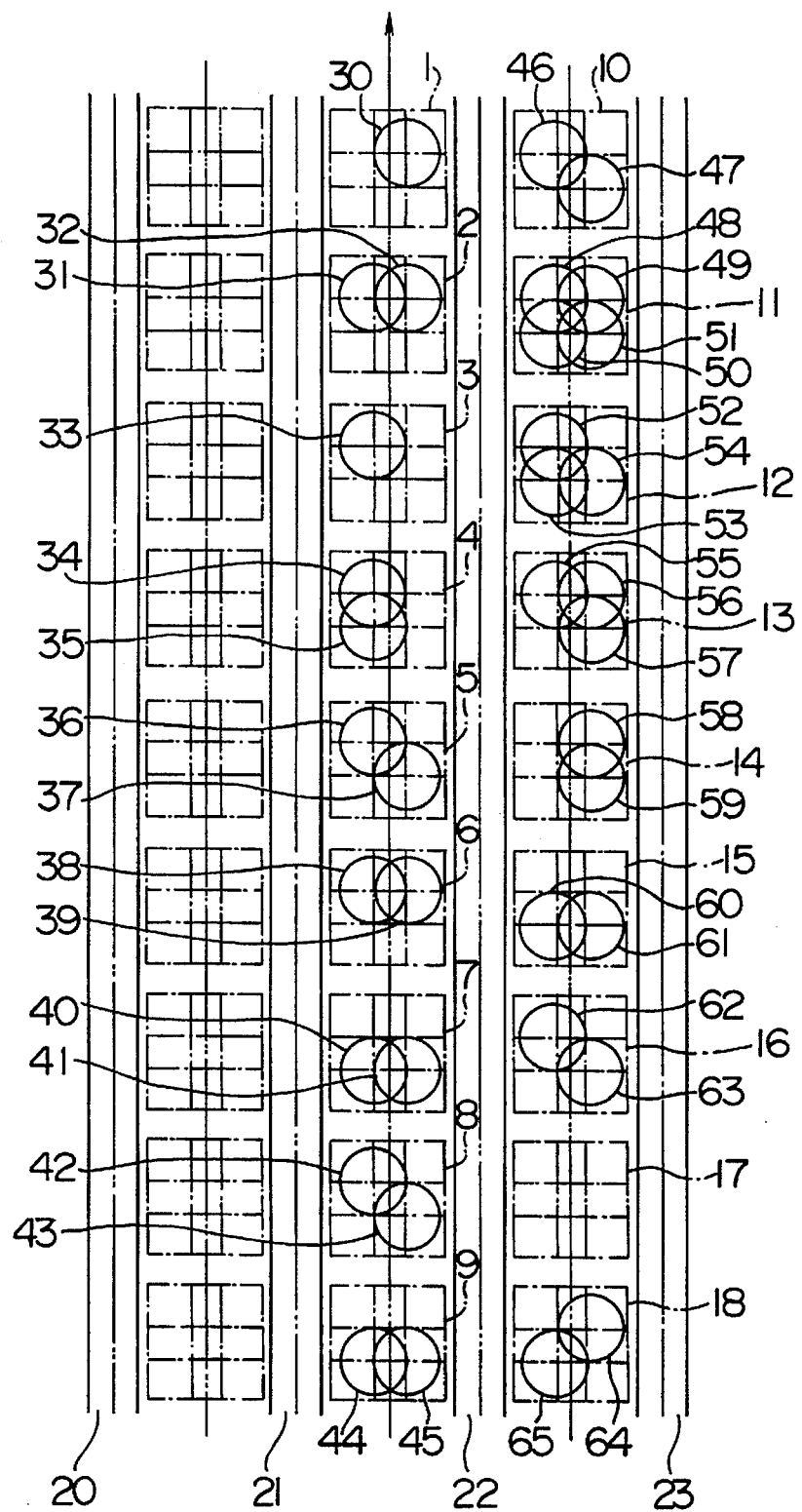
FIG. 3 is an explanatory diagram for showing the recorded pit groups.

FIG. 3 is an explanatory diagram for showing the above-described pits which have been recorded on the disk. The data arrangement along a circular direction of the disk (arrow direction) is such that the above-described blocks 1 to 18 are arranged along the circular direction as represented by a dot and dash line. Gaps with equiintervals are formed in order that the spaces between the respective blocks along the track direction can be recognized as the block spaces. Data are recorded among the guide grooves 20, 21, 22 and 23 of the normal consecutive servo system. A track shift signal for positioning a recording spot is detected by utilized diffraction emitted from the guide groove with employment of the normal track shift detecting method Although the pits overlapped with each other in the above-described preferred embodiment, the pits may be alternatively formed in such a manner that they don't overlapped with each other. In this case, although line density becomes coarse, a complex signal processing system is not required to reproduce the recorded signals. Moreover, since a plurality of pit columns may be recorded within one time, the track pitches may be narrowered by the variations in the track shifts, as compared with the conventional method.

When the grid interval along the track radial direction is made smaller than the diameter of the round hole, the pits may overlap with each other among the two-dimensionally arranged patterns. In this case, a rule of codes must be established, taking account of the reproducing process. This rule establishment will be described later with reference to FIG. 18A.

To record the patters according to the present invention, a positional relationship between recording pits must be correctly controlled.

A consideration will now be made of a method for recording a pit group to correctly control such a positional relationship. If such a conventional method that one pit array is recorded on one array of the optical disk every 1 rotation and subsequently another one pit array is recorded on the adjacent one array, is employed in the present embodiment, the conditions of the optical spot controls in the information recording/reproducing apparatus are varied, whereby the positional relationship of the pits in the track radial direction would be shifted.

Accordingly, a plurality of spots are employed in this embodiment, and the above-described two-dimensionally arranged pit group is recorded within at least one rotation period.

Figure 20:
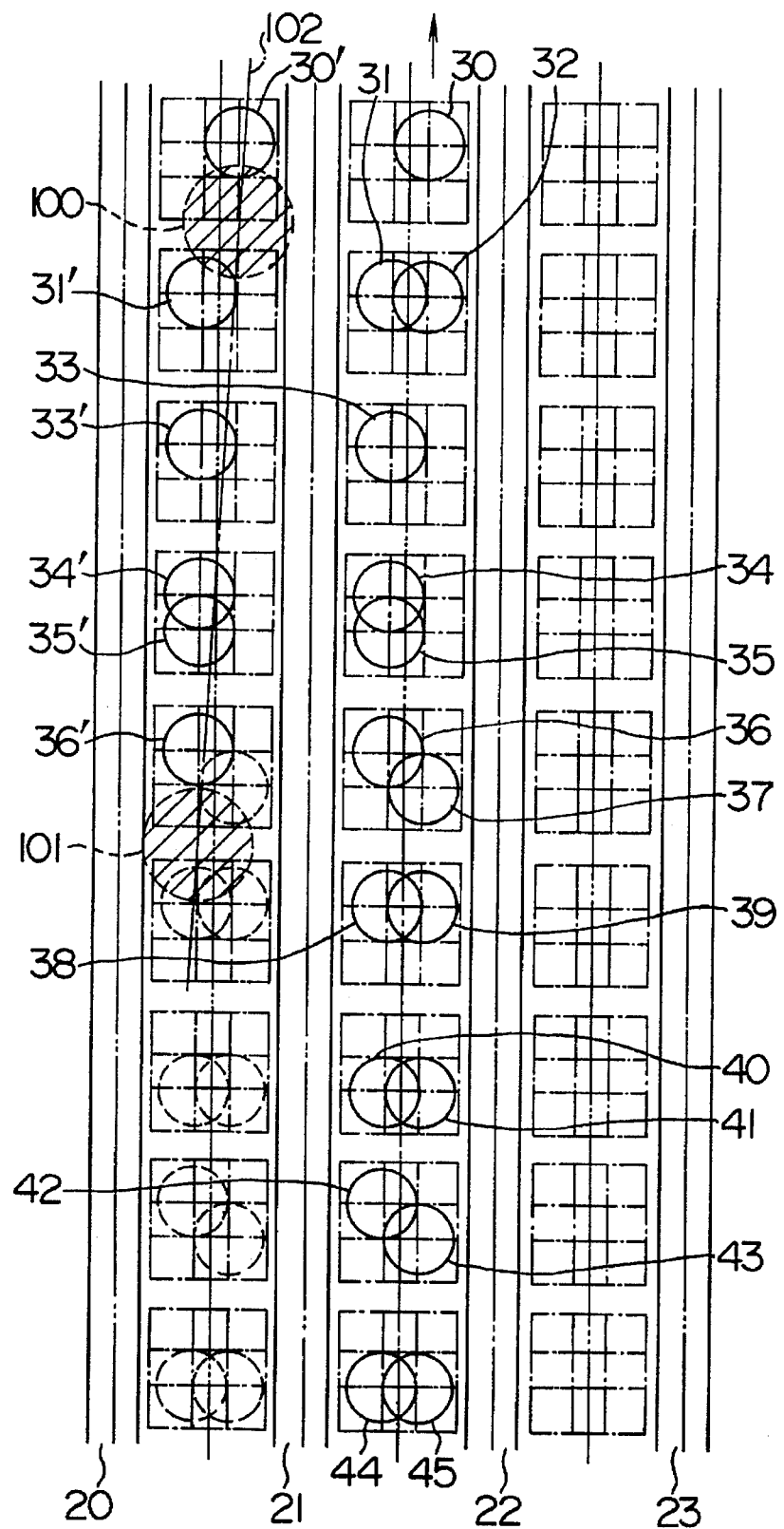
FIG. 20 is an explanatory diagram for showing a relationship between recording reproducing spots and pit groups; and, FIG. 21 illustrates an overall system diagram according to the present invention.

A concrete positional relationship of the spots is represented in FIG. 20. In FIG. 20, circular portions covered with inclined lines indicate optical spots 100 and 101, an axial line 102 to connect these spots is slightly inclined with respect to the track circumferential direction, and these optical spots are mutually shifted with respect to the track radial direction due to this inclination. It is originally preferable to position two spots in a close state. However, taking account of the characteristics of the current semiconductor laser, the spot interval on the disk plane should be selected to be greater than 10 microns. Considering both the extending angle of the semiconductor laser and light utilization efficiency, the numerical aperture of the lens for coupling light from the semiconductor laser is from 0.15 to 0.3 approximately. Since the numerical aperture of the object lens is not selected to be so large value due to the characteristic of the disk substrate, it is about 0.5 to 0.6. As a consequence, a lateral magnification of an overall optical system becomes 2 to 4. The emission interval of the current semiconductor laser is set to larger than 50 μm due to various reasons, for instance, prevention of thermal interference. Also, since the grid interval must be smaller than the conventional track pitches from 1.6 to 1.5 μm, such an arrangement that the spots are separated along the track circumferential direction may be realized under the present technical level. This shift amount is recognized as an interval of the above-described grid in the track radial direction.

For the sake of explanation, in FIG. 20, there are shown the recorded two-dimensional arrangements at the right hand track (track between the grooves 21 and 22), and also the relationship between the optical spot and pit in the recording step at the left hand track (track between the grooves 20 and 21). It should be noted that the disk plate is rotated along an arrow direction. Pits 30', 31', 33', 35', 36' which have been recorded and through which the recording spot 101 has already passed, are indicated by a solid line. Pits which will be recorded are indicated by a dot line.

Although the same block is not simultaneously recorded in this spot arrangement, the recording operation is completed after a time difference corresponding to the spot interval along the track circumferential direction, namely the same one rotation period.

To form the two dimensional arrangement, illumination strengths of the respective recording spots are modulated in response to the data on the one-dimensional arrangement and the pits are recorded in one dimensional manner along the track circumferential direction.

To convert this two-dimensional arrangement into the one-dimensional arrangement corresponding to the respective recording spots, a predetermined coding list is employed. A coding list corresponding to the two-dimensional arrangement shown in FIG. 2 is indicated in FIG. 4. This coding list is inputted into a ROM (read-only memory) and based upon the data to be recorded, data for realizing the two-dimensional arrangement corresponding to these data to be recorded are retrieved. To obtain one-dimensional arrangement for modulating plural light sources (two light sources in an example shown in FIG. 4) based on this data, since the above-described data correspond to 4-bit data as shown in FIG. 4, the upper two bits correspond to the one-dimensional arrangement for modulating the light sources by which the preceding spots have been formed, whereas the lower 2 bits correspond to the one-dimensional arrangement for modulating the light sources by which the succeeding spots have been formed. Furthermore, the sequential number at the one dimensional arrangement is first defined from the upper bit of the above-described data.

Figure 5:
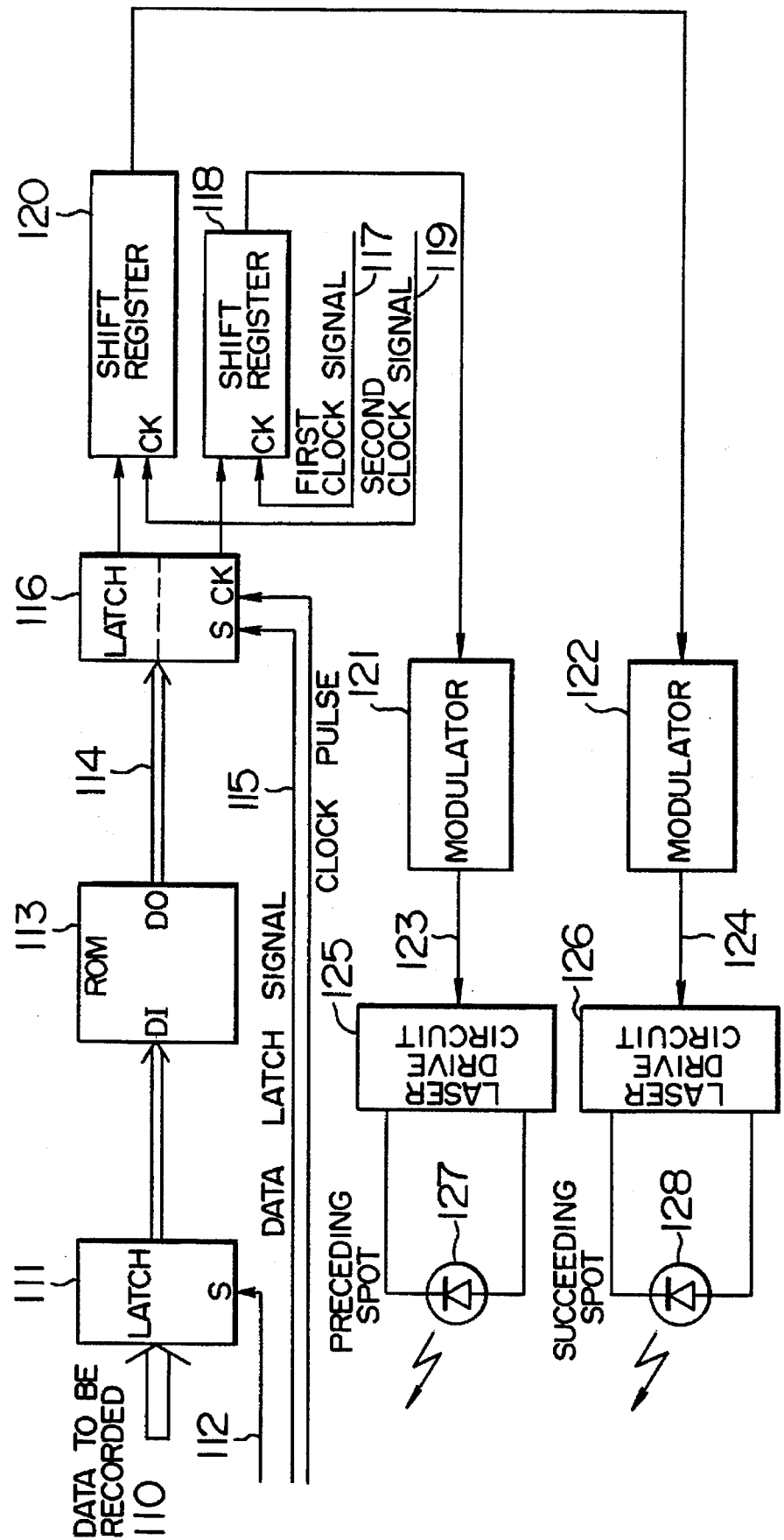
FIG. 5 is a schematic block diagram for representing a signal recording system.

Operation of the recording signal processing system with employment of such a coding list will now be described with reference to FIG. 5. Data 110 to be recorded is inputted into a latch circuit 111 and stored in response to a latch control signal 112 every 4 bits. This 4-bit data is inputted into a ROM 113 so as to retrieve 4-bit data for realizing a two-dimensional arrangement. The retrieved data 114 is stored in a latch circuit 116 in response to another latch control signal 115. The lower bit data of this data 114 is read out in response to a first clock signal 117 and then stored into a shift register 118 having a finite length in synchronism with a clock signal 117. Also, the upper bit data of this data 114 is read out in accordance with a second clock signal 119, and is stored into a shift register 120 having a length longer than that of the above-described shift register 118 is synchronism with a clock signal 119. Outputs of these shift registers 118 and 120 are connected to each of modulators 121 ad 122, and thus binary-coded signals derived from the shift registers 118 and 120 are converted into analog signals 123 and 124 for modulating the emission strengths of the lasers. In this case, the emission waveforms of the optical pulses are controlled in order to control the shapes of the recorded pits. For instance, to stably record the round pits shown in FIG. 1, since such a recording method is known that the optical pulses more shorter than the clock of data are employed with high emission power, such a control is performed. Furthermore, the modulators perform such a complex waveform control that the recording power is increased during a certain period of the record starting period, depending upon the line speed and recording medium.

In response to signals 123 and 124 from the modulators, laser drive circuits 125 and 126 are driven in order to modulate the emission power obtained from light sources 127 and 128 for firming the respective spots.

The lengths of the shift registers are varied in this block diagram, which implies that a correction is made with the clock period in the positional shifts of the two recording spots in the circumferential direction, as shown in FIG. 20, by shifting the recording timing of the succeeding spots. Although the first and second clock signals 117 and 119 have the same periods, there is a shift in a phase relationship. This phase shift amount corresponds to a correction amount used for correcting the positional shifts made by the shift registers and for controlling a position of a very small optical spot within a clock period. Furthermore, in the first and second clock signals 117 and 119, there are periods having constant intervals in which no clock appears in order to form the above-described gap between the blocks.

Referring now FIG. 6, a method for reproducing data will be explained. The optical spots 100 and 101 which have been used for recording the pits are employed so as to reproduce a recorded pit group. A tracking adjustment with employment of the diffraction derived from the guide grooves 21' and 22' is performed which is similar to the recording operation, and the respective optical spots are positioned to the one-dimensional pit arrangements (center lines of which are 130 and 131) in the circumferential direction, corresponding to the one dimensionally arranged data to be recorded. To detect data, a judgement must be performed whether or not a pit is present on a grid point. To this end, a strobe pulse corresponding to the position of the grid point is produced, levels of signals which have been read out from the respective spots are sampled and held by this strobe pulse, and then the level of the signal read out from the grid point is detected. The judgement whether or not there is the pit at the grid point is performed by comparing this level of the detected signal with a specific level.

Figure 15A:
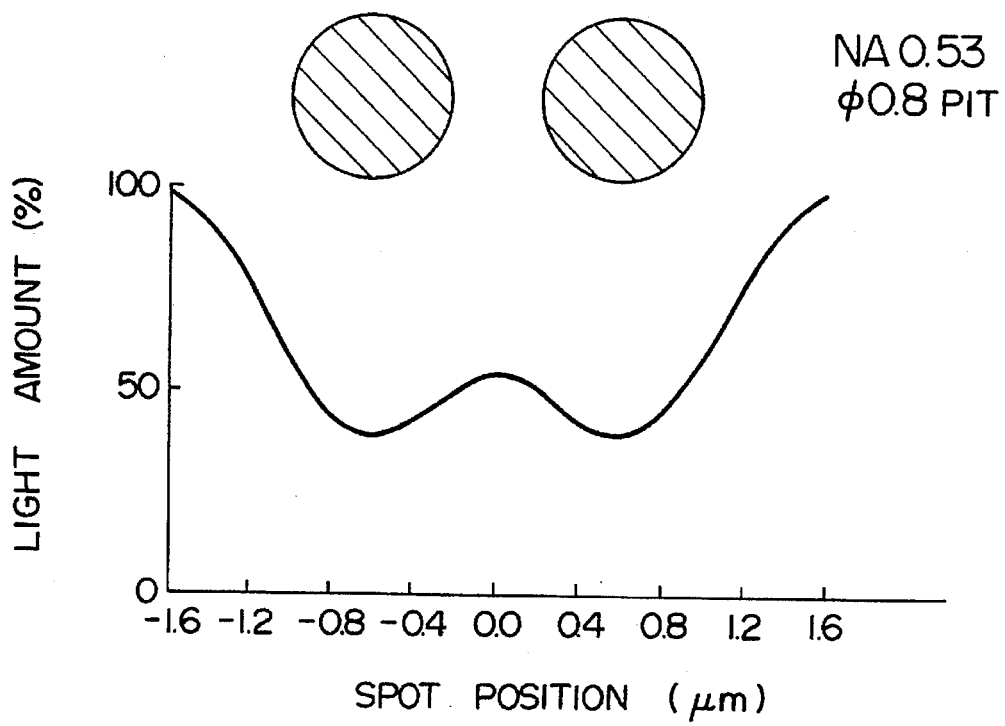
FIGS. 15A, 15B and 15C represent relationships between the pit intervals and the signal outputs.
Figure 15B:
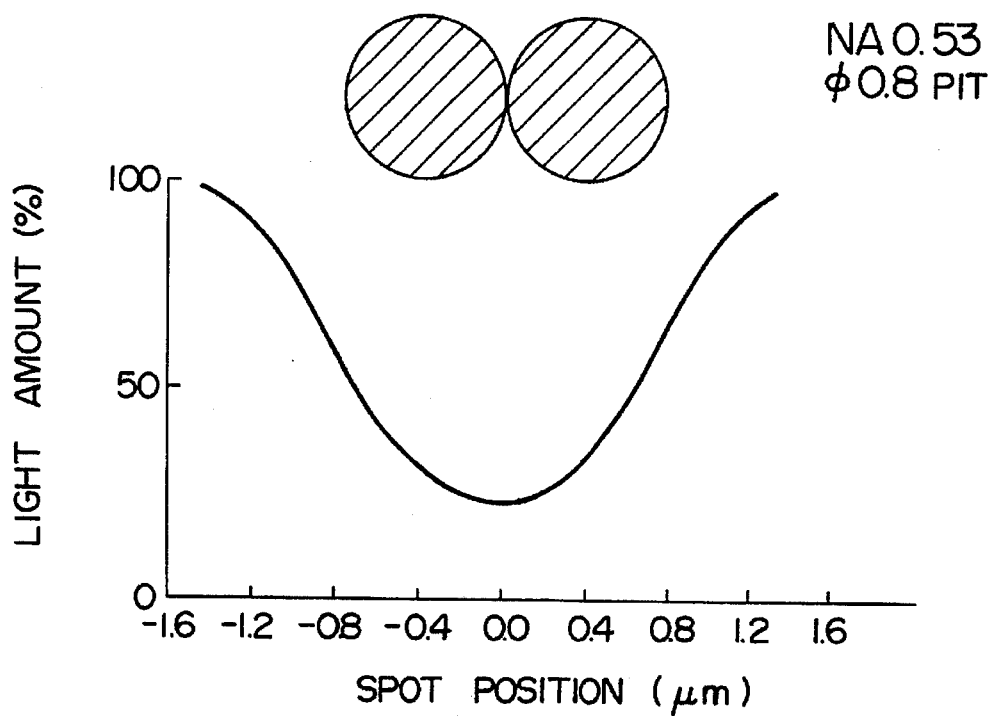
Figure 15C:
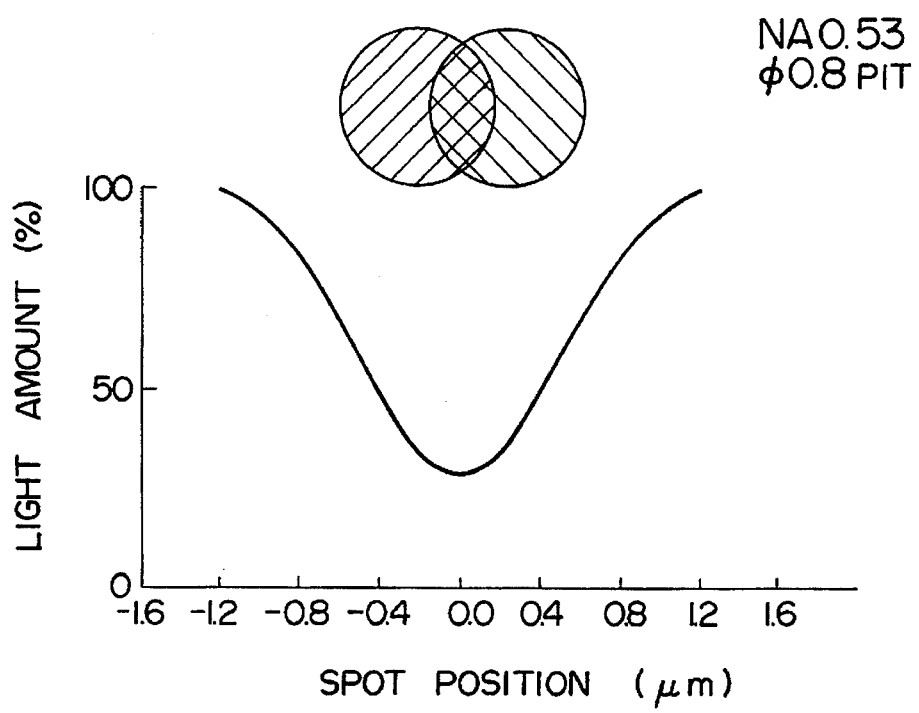

In FIGS. 15A, 15B and 15C, there are represented reproduction signals, as a simulation, which are obtained by changing two pit intervals of pit arrays constructed of two pits each having a diameter of 0.8 µm with employment of the normal optical system where the numerical aperture of the object lens is 0.53 and the wavelength of the laser is selected to be 830 nm. Comparing a case of FIG. 15A where the minimum interval between the adjoining pits is opened by 0.4 µm, another case of FIG. 15B where the minimum interval between the adjoining pits is 0.0 m (namely, these pits are in contact with each other), with another case of FIG. 15C where the bits overlapped with each other, it is difficult to discriminate the case of FIG. 15B from the case of FIG. 15C by merely comparing the levels of the reproduced signals at the pit centers, in view of the level margins. To the contrary, such a discrimination may be easily achieved between the cases of FIGS. 15B and 15A. As a consequence, the positional relationships of the pits are so determined by the following coding rule that the case of FIG. 15B and the case of FIG. 15C never happen to occur simultaneously.

Here, a coding rule according to the present embodiment (arranging relationship of codes) will now be described with reference to FIGS. 18A, 18B and 18C.

That is to say, overlaps of bits are allowable in this preferred embodiment, and it is desirable to arrange a block corresponding to the plural overlaps of the pits and also another block adjacent to this block as closely as possible so as to achieve high density of an optical disk. However, since interference happens to occur between bits during the reading operation, the intervals between the respective blocks are so arranged that the outermost pit intervals formed in the respective blocks are separated with each other for from the interference distance determined by the optical system.

When a round pit is stored, it is assumed that a size of this pit is selected to be "W" and a size of a reading spot is selected to be "Ws". First, mutual interference of a sole pit will now be explained with reference to FIG. 18A.

When a spot is present at a position 701-1 among pits 700 and 701, for instance, there is a possibility that an edge of this spot is influenced by an outer periferal portion of the pit 700 and therefore a signal level of a center 701-1 of the pit 701 is influenced.

A condition neglectable this adverse influence is given by that a distance "L" between the centers 700-1 and 701-1 satisfies the following condition.

$$L \geq W/2 + Ws/2 \qquad \text{(formula 1)}.$$

The size of the reading spot "Ws" is given as follows, assuming now that the wavelength of the laser is "λ" and the numeral aperture of the object lens is "NA", $$Ws = k \times \lambda / NA \qquad \text{(formula 2)}.$$

where symbol "k" is equal to 0.85 in principle, but to approximately 1.0 due to the actual assembling and manufacturing steps of the optical system. The above-described results are coincident with results of the simulations shown in FIGS. 15A, 15B and 15C. As apparent from the results of these simulations, it the pits overlapped with each other, the simple overlapping of the solitary waves usually employed in the conventional magnetic disk or the like cannot be satisfied. This is because the optical resolution is no longer present and the optical characteristic at the overlapped portion is not different from that at the non-overlapped portion. As a result, there is a slight change in the signal levels at the overlapped portion and also non-overlapped portion, as in the simulations. Assuming now that as the concrete values, the wavelength is 830 nm, NA is 0.53 and the diameter of the pit is 0.8 µm, the distance "L" becomes approximately 1.2 µm. The grid interval has been selected to be ⅓ of this length "L", i.e., 0.4 µm in this preferred embodiment.

The mutual interference between the pits is established not only in the track direction, but also in the track radial direction, namely isotropically and two-dimensionally established. Accordingly, assuming now that the grid interval in the track direction is "a" and the grid interval in the track radial direction is "b", "a" is equal to "b". Then, a circle having a diameter equal to a diameter of a spot is drawn from a center of one pit, and it is so arranged that an edge of other pit is not in contact with this circle and the center of the pit is present at the grid point. Subsequently, a description will now be made of such a case that pits are not sole but are overlapped with each other with reference to FIGS. 18B and 18C. In this preferred embodiment, it is recognized that the pits 708 and 709 are overlapped with each other, and it is necessary to take the similar distance relationship to that of the pits 700 and 701 present in the track direction, with respect to the pit 710 and the pit 709 corresponding to the outermost pit. The block of the connected pits is formed by overlapping the pits with each other, and the relationship between the blocks corresponds to such a relationship that with respect to the pit centers at the outermost portions for forming the respective blocks as a center, the pit of other block is not contact with a circle having a diameter of a spot diameter. As illustrated in FIG. 18C, assuming now that grid-grid intervals "a" and "b" are commonly 0.4 µm, a diameter of a pit is 0.8 µm, and a diameter of a spot is 11.6 µm, grid paints where the pits of other block can exist in the blocks constructed of pits 711', 712' and 713' are expressed by white rounds, whereas grid points in which the pits of other block cannot exist in the blocks are indicated by black rounds.

While the two-dimensionally arranged pit arrangement in one information track has been described, the pit arrangement between the successive tracks will now be described as follows.

As shown in FIG. 1, assuming now that a distance over laser spots formed from a plurality of light sources along a disk radial direction is selected to be "L", a track pitch of a two-dimensional code is selected to be "p", and a spot size is selected to be "Ws", a relationship defined by the following formula is required:

$$p \geq L + Ws$$

Then, a method for forming the above-described strobe pulse will now be described.

To produce the strobe pulse, a reference signal for forming a timing to generate the pulse must be detected from the recorded data. Although there is the selfclocking method in which the signal of data is directly used as this signal, if there is such a pattern that no pit appears in the recording pattern after the coding operation so represented in No. 15 of FIG. 2, there is a possibility that the signal for producing the timing cannot be detected from the recorded data. Then, as represented from FIG. 6, synchronization marks 132, 132', 133 and 133' are formed in the recorded data and a format for the recorded data is predetermined in such a manner that these marks surely appear at a specific interval. Although it is preferable that these synchronization marks are previously formed on the disk, it is possible to form these marks during the recording operation by the recording/reproducing apparatus according to this preferred embodiment. With the later method, although the data efficiency is slightly lowered, the reference signal to form the strobe pulse may be stably detected.

Figure 6:
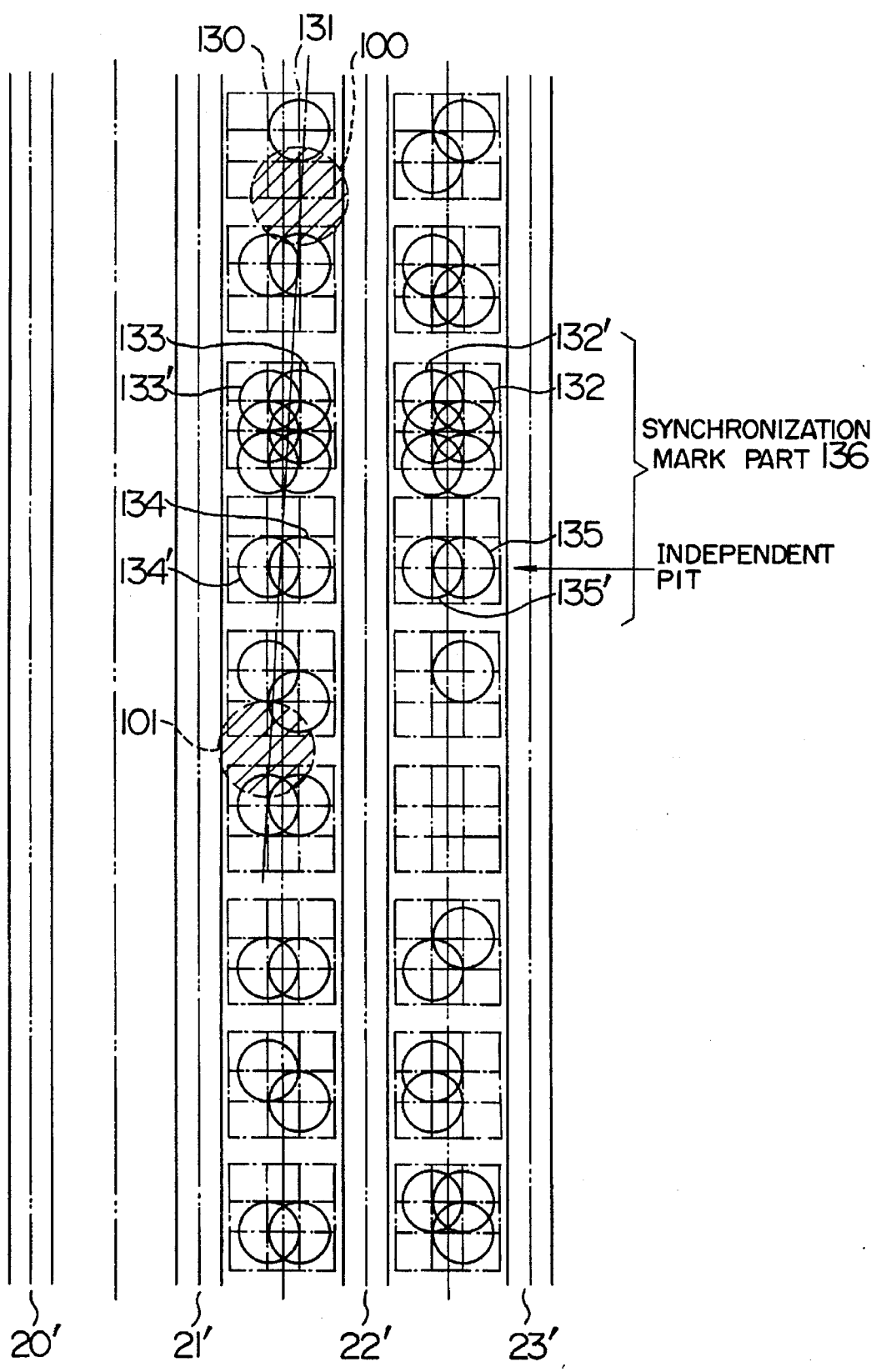
FIG. 6 represents a pattern diagram for a synchronizing mark used for producing a clock.

The synchronization marks 133, 133', 132 and 132' shown in FIG. 6 do not appear in the recorded data, and are formed by overlapping three pits, and one pit 134, 134', 135 and 135' are present which is apart therefrom. First, a detection is made of such a pattern that three pits are overlapped with each other, and then positions of the independent pits 134, 134', 135 and 135' separated from this pattern by a predetermined distance and predicted. Center positions of the independent pits 134, 134', 135, 135' are detected by differentiating the reproduction signals obtained from the independent pits 134, 134', 135 and 135' and finding out a zero cross point. Since the center position of the independent pit is coincident with the grid point, the reference position to detect the timing of the grid point can be obtained. Such a reference point is detected at a constant interval, and a reference clock is produced by the clock generating means which is well known as a PLL (phased lock loop).

Figure 7:
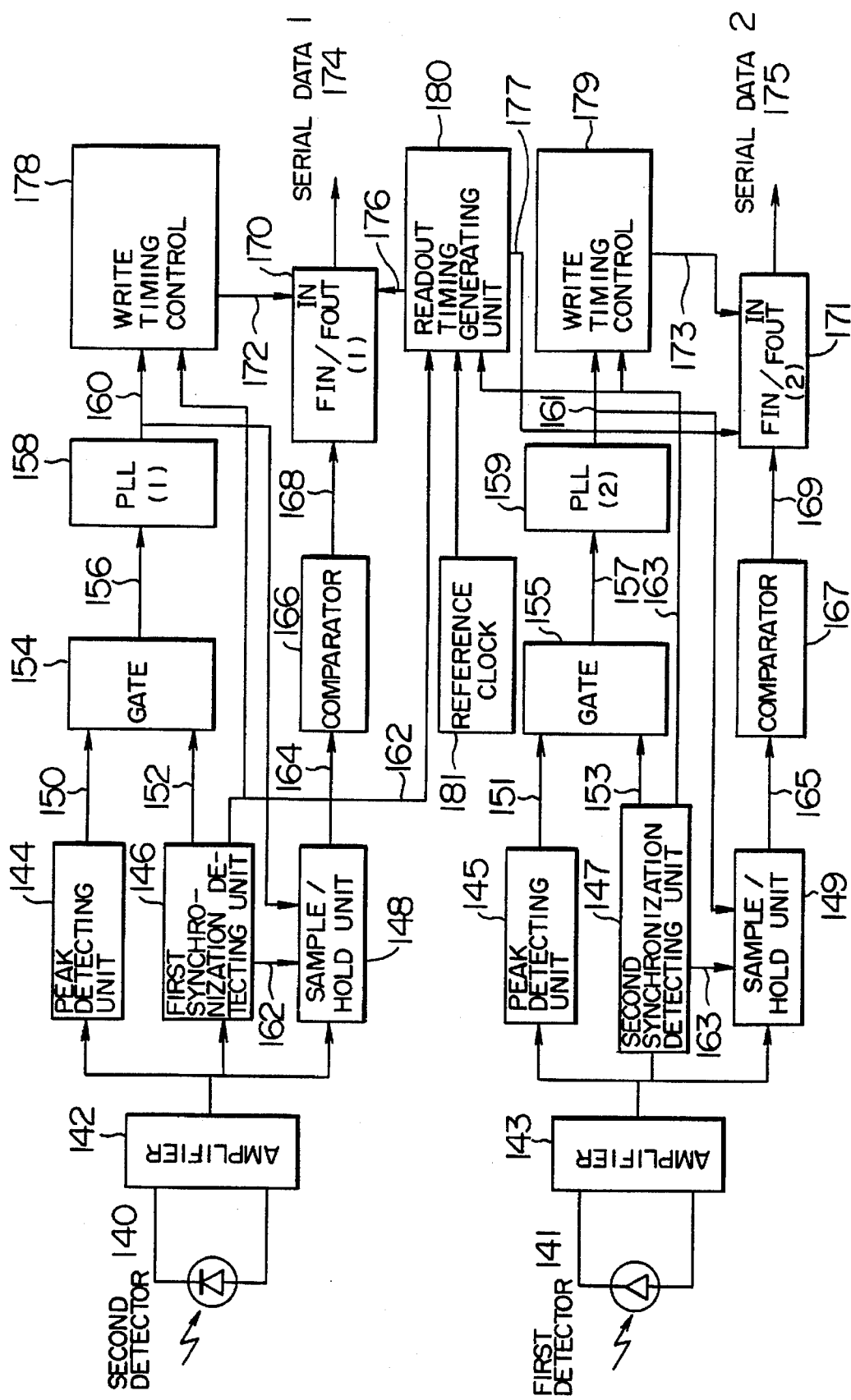
FIGS. 7 and 8 are schematic block diagrams for showing a data reproducing system.

A reproduction signal processing system will now be explained with reference to FIGS. 7 and 8. The light source employed in the recording apparatus shown in FIG. 5 may be commonly utilized as a light source. The light emitted from this light source is irradiated to the pits, and the light reflected from the respective spots is detected by optical detectors 140 and 141 corresponding to the respective spots. The signals after being photoelectric-converted are amplifiers 142 and 143, and are inputted into peak detecting circuits 144, 145, synchronization part detecting circuits 146, 147 and sample/hold circuits 148, 149. As described above, the signals from the independent pits 134, 134', 155, 155' are differentiated in the peak detecting circuits 144 and 145 so as to detect the zero points, and also produce pulses 150 and 151 corresponding to the peak points.

In the synchronization part detecting circuits 146, 147, pit patterns 132, 132', 133 and 133' in which 3 round pits are overlapped with each other as shown in FIG. 6 are detected from the reproduction signal. To this end, the reproduction signal is sliced at a specific level and then a detection is made whether the pulse length after slicing operation is within a range of a certain length. Since the three round hole pits are not overlapped with each other in the normal data due to the coding rule, the synchronization mark part can be detected. Gate pulses 152 and 153 having constant widths for covering the position of the independent pit are formed from the synchronization part after a predetermined time lapse. Both the gate pulses 152, 153 and the output pulses 150, 151 from the peak detecting circuits 144, 145 are inputted into the gate circuits 154, 155, and pulses 156 and 157 corresponding to the centers of the independent pits immediately after the synchronization part and produced.

These pulse signals 156 and 157 are inputted into PLLs 158 and 159, whereby clock signals 160 and 161 having a frequency which is higher than the repetition frequencies of these pulse signals 156 and 157 by multiplication of an integer. The frequencies of the clock signals 10 and 161 are substantially equal to those of the above-described recording clocks 117 and 119.

To the sample/hold circuits 148 and 149, both the synchronization detecting pulses 162, 163 and the clock signals 160 and 161 are inputted, and the level of the reproduction signal from the data pit is sampled/held. The sampled/held signals 164 and 165 are inputted into level comparators 166 and 167, and then converted into binary-coded signals by checking whether or not the level of the input signal is higher than a specific level. Thus, the binary-coded signals 168 and 169 are inputted into first-in/first-out memories 170 and 171, and accumulated therein in response to timings 172 and 173 of control clock signals (will be discussed later). The above-described arrangement corresponds to an arrangement of a series of processing circuit with respect to the respective spots, and there are the above-described 2-series processing systems as the apparatus. To discriminate elements of the below-mentioned respective constructive blocks, numerals "first" and "second" are attached. One-dimensionally arranged data 174 and 175 which have been stored in the two memories 170 and 171 are read out and are required to be rearranged as two-dimensionally arranged data. To achieve such a requirement, one-dimensionally arranged binary-coded data which are recorded on the same radial positions of the disk plane must be positionally coincident with each other. Thus, these data are numbered as a unit of clocks 160 and 161 under the condition that the synchronization marks 132, 132', 133 and 133' among the respective one-dimensionally arranged data are employed as references. Thereafter, the data having the same number which have been stored in the respective memories are read at the same timings 176 and 177 every one-dimensional arrangement. A first timing control circuit 178 and a second timing control circuit 179 are employed so as to control the timings at which the data are stored into the respective memories 170 and 172. In the first and second timing control circuits 179 and 178 for writing the data into the memories, both the clocks 160 and 161 formed in the first and second PLLs 158 and 159, and the synchronization detection pulses 162 and 163 are utilized, after the synchronization marks 132, 132', 133, 133' have been detected, pulses 172 and 173 for sequentially writing the data into memories 170 and 171 are produced. As a result, the one-dimensionally arranged data are sequentially stored into the respective memories 170 and 171 as the synchronization marks 132, 132', 133 and 133' being references.

The data readout timings are performed by controlling the respective memories 170 and 171 in accordance with the readout pulses 176 and 177 derived from the readout timing generating circuit 180. These timings are performed in such a manner that while monitoring the generating times of the synchronization pulses 162 and 163 from the first and second synchronization detecting units 146 and 147, pulses 176 and 177 for commencing the readout operation are generated after the late generated synchronization pulse has come. As this pulse period, it may be produced from a reference clock 181 having a constant period, and also a clock pulse may be employed which has been produced from the clock pulse by the PLL used in the signal processing system for the late-coming synchronization pulse. As a consequence, the recorded radial positions of the first and second serial data 174 and 175 which have been read out from the memories are completely coincident with each other.

Figure 8:
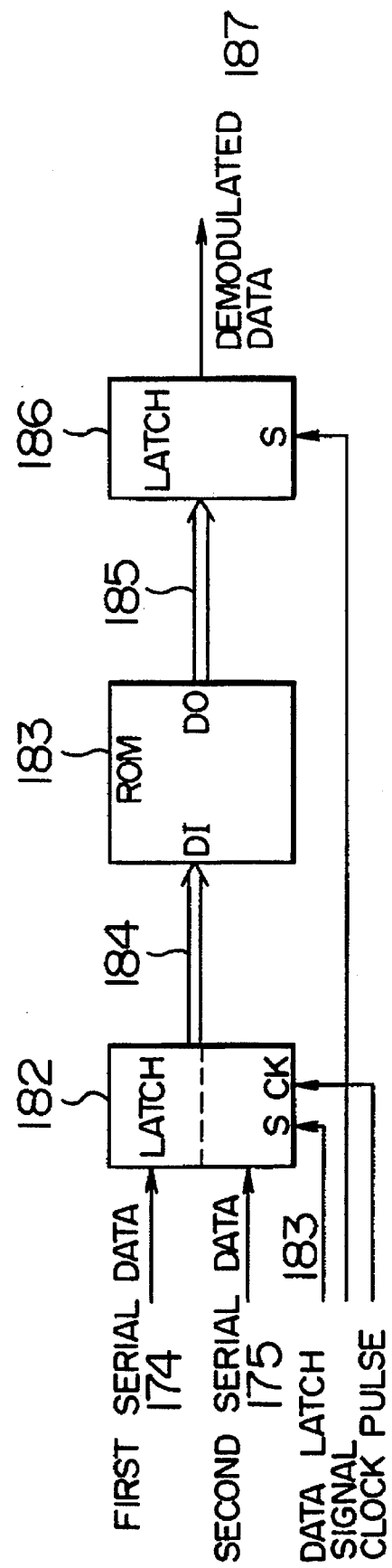

These serial data 174, 175 are fetched into a latch circuit 182 every block; as shown in FIG. 8. A data latch signal 183 is produced by frequency-dividing the clock 181 at a half frequency in the above-described readout timing control circuit 180. 4-bit data 184 indicative of the two dimensional arrangement are inputted into ROM (read-only memory) 183 having an inverse conversion list to that of FIG. 3 every block, one set of data 185 corresponding to the two dimensional arrangement is retrieved and then fetched into a latch circuit 186. This data 186 becomes data 187 demodulated by the signal processing circuit.

Figure 9:
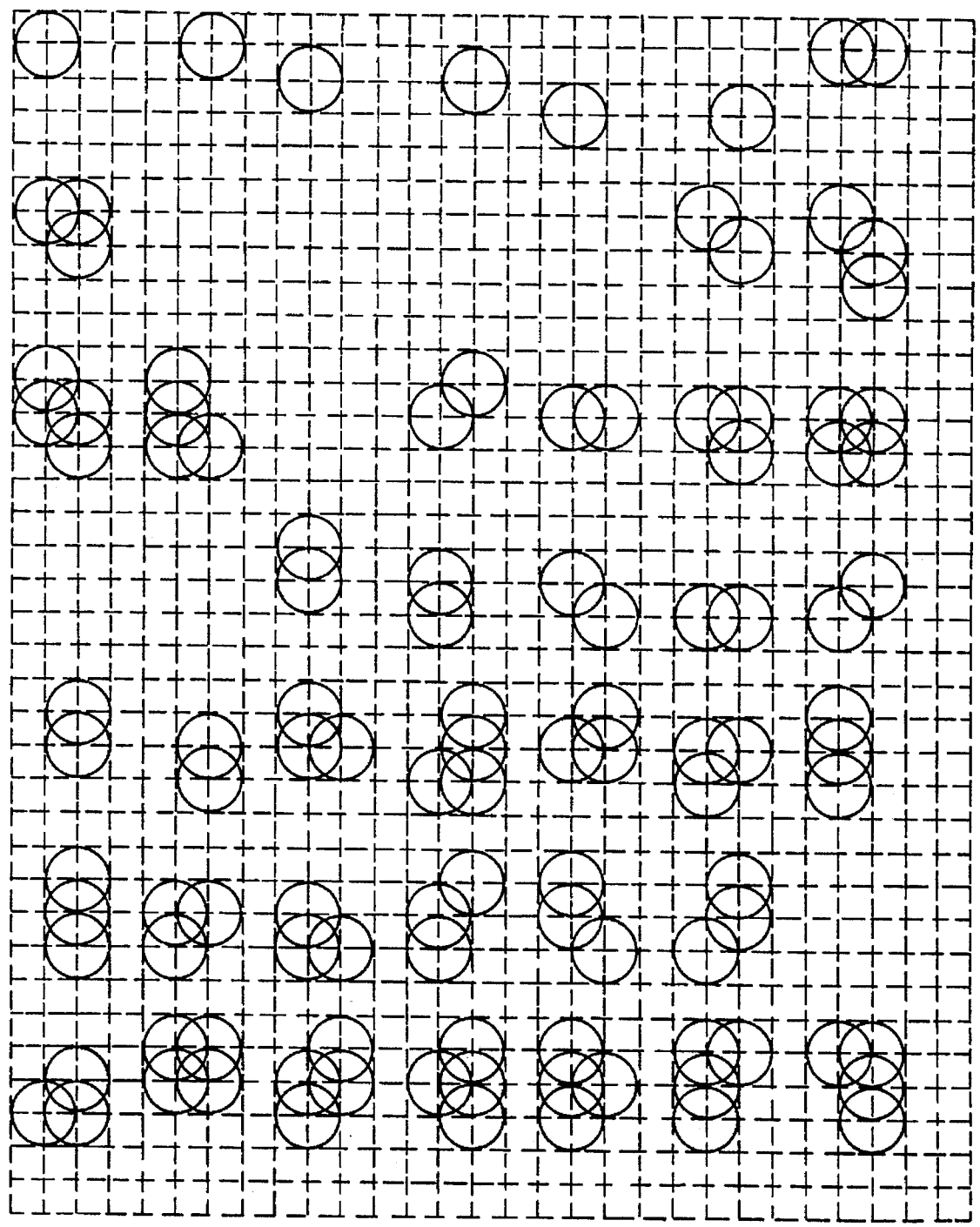
FIG. 9 is an explanatory diagram for indicating a two dimensional arrangement corresponding to 5-bit recording data.
Figure 10B:
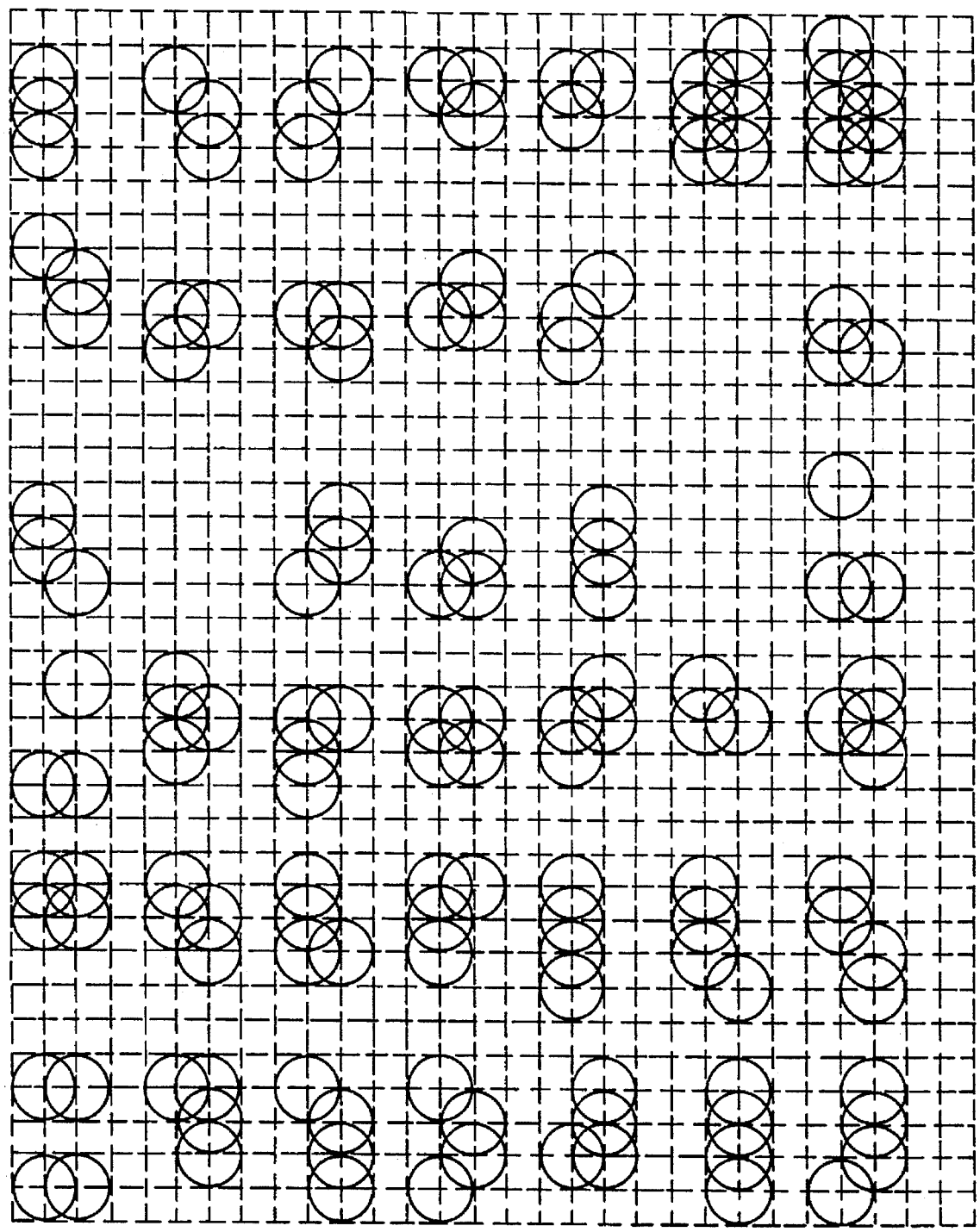
Figure 10D:
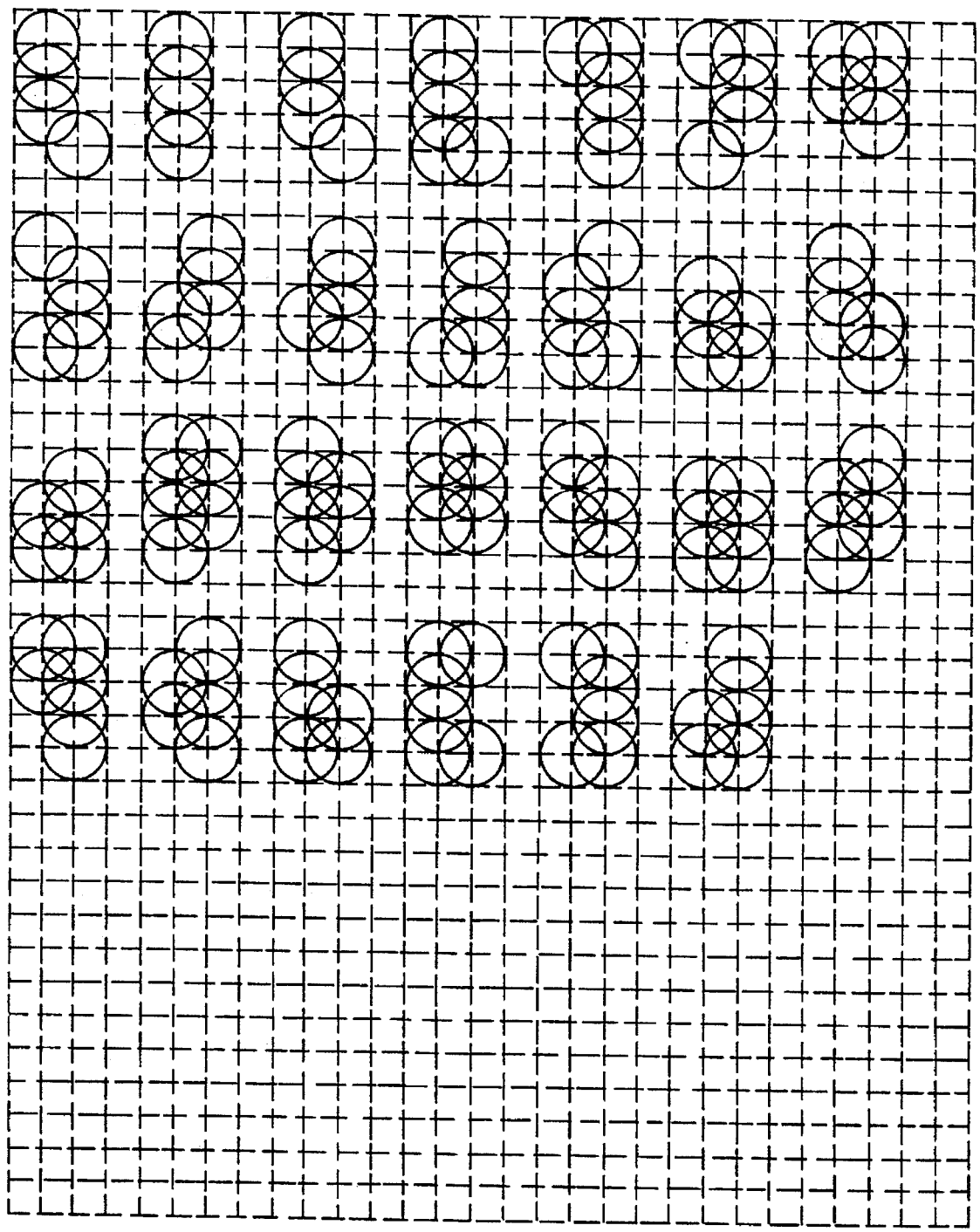

While such an example where 4 (2 lines/2 columns) grid points are employed has been explained as the pit group for the recording blocks, other examples such as 6 (3 lines/2 columns) and 8 (4 lines/2 columns) grid points will now be described. FIG. 9 illustrates an example of two dimensional arrangement in case that grid points are 6. Theoretically, 6 bit data can be represented as the recording data. However, if there are excessive numbers of pits within this block, since the reflection light amount during the signal reproduction is lowered, these blocks are not utilized in this example, and therefore represent 5-bit data, respectively. During the recording operation, these data are converted into 2 sets (2 columns) of one dimensional arrangement. In the conversion list, 5 bits correspond to 6 bits. Each of the one-dimensional arrangements uses upper 3 bits and lower 3 bits. The 6 bits data is sequentially recorded from the upper bit data to the lower bit data on the respective one-dimensional arrangements. In FIG. 1, there is shown an example where the pits have been recorded on the disk with employment of this system.

FIGS. 10A to 10D represent another example of two-dimensional arrangements in which grid points are 8. Due to the similar reason to the previous case, it is preferable to express 7 bits data as the recording data. To record the data, this data is converted into two sets (2 columns) of one-dimensional arrangements.

In a conversion list, 7 bits correspond to 8 bits. Each of the one-dimensional arrangements utilizes the upper 4 bits data and lower 4 bits data of this 8-bit data. The 8-bit data is sequentially recorded from the upper bit data to the lower bit data on the respective one-dimensional arrangement. In any cases, to demodulate the data, an inverse conversion list corresponding to the modulation is employed as previously described in such a case that the recording data is 4 bits.

Figure 19:
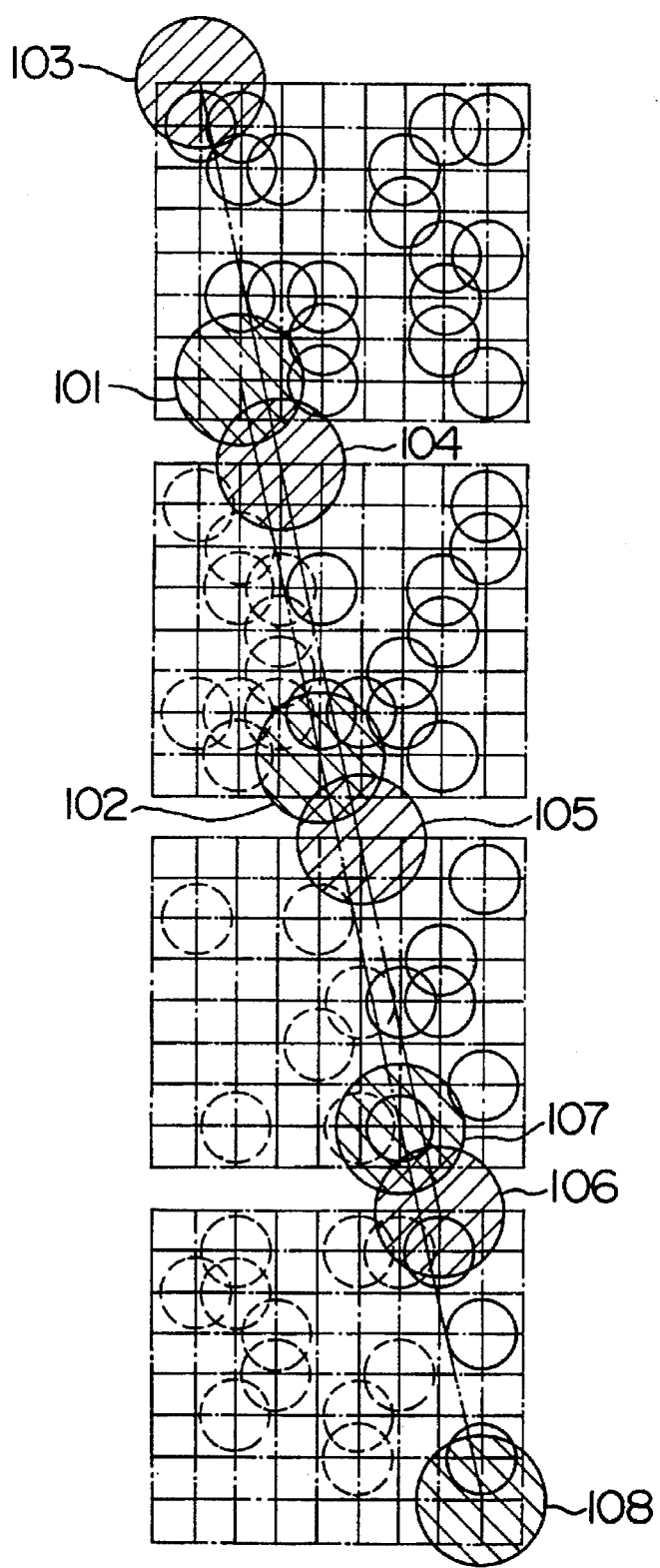
FIG. 19 is an explanatory diagram for showing another preferred embodiment in which 7 crosspoints of the recording blocks have been formed in the track direction and 8 crosspoints thereof have been formed in the radial track direction.

FIG. 19 illustrates another preferred embodiment that grid points are further increased in the line and column directions. In this figure, there are 56 grid points, namely 7 points along the track (column) direction and 8 points along the track radial (line) direction. Since there exists such a relationship of C=k−1 between the number "k" of grid points and the number "C" of data bit indicated by this grid point number, data having on the order of 55 bits may be expressed also in this preferred embodiment. The plane recording density may be increased in the present invention, due to the coding operation of the present invention, as compared with the conventional method. A relationship between the increased ratio of the plane recording density and the total quantity of grid points may be expectedly increased by approximately 10 times higher than the conventional relationship, although the increased ratio is saturated in accordance with an increase of the grid points. Simultaneously, the transfer rate may be expectedly increased by about 10 times higher than the conventional transfer rate. To record the bit arrangements according to this preferred embodiment, LD1 and LD2 (will be discussed later) are arranged by array lasers on which 4 lasers commercially available have been mounted. As a result, spots 103, 104, 105 and 106 are formed by one array laser on the disk plane, whereas spots 101, 102, 107 and 108 are formed by another array laser. The pits recorded by these spots are formed in accordance with the coding rule which has been explained in connection with FIGS. 18A to 18C.

Furthermore to achieve higher density, when both a distance between pits and another distance between one-dimensionally arranged tracks are shortened, the strength of the mutual signal interference becomes high and also the level margin to detect the signals is lowered. Then, a method for eliminating the interference between the signals and for improving the detecting margin will now be described.

Assuming now that the signals detected from the right column is $I_1(t)$ and detected from the left column is $I_2(t)$ when reproducing the pits by the spots as shown in FIG. 1, a delay time between the right and left spots is $\tau$, and coefficiencies of the mutual interference among the respective signals are $\eta$ and $\xi$, and also signals having no interference are $i_1(t)$ and $i_2(t)$, these detected signals are analogously expressed by:

$$I_1(t-\tau) = i_1(t-\tau) + \eta i_2(t)$$

$$I_2(t) = i_2(t) + \xi i_1(t-\tau)$$

As a consequence, the signals having no interference may be obtained by the following equations:

$$i_1(t-\tau) = \frac{I_1(t-\tau) - \eta I_2(t)}{(1-\eta\xi)}$$

$$i_2(t) = \frac{I_2(t) - \xi I_1(t-\tau)}{(1-\eta\xi)}$$

Accordingly, the data having no interference may be detected by performing this calculation from the detected signals. In the example shown in FIG. 6, the coefficient "$\eta$" of this interference becomes 0.3 to 0.4 approximately.

Figure 11:
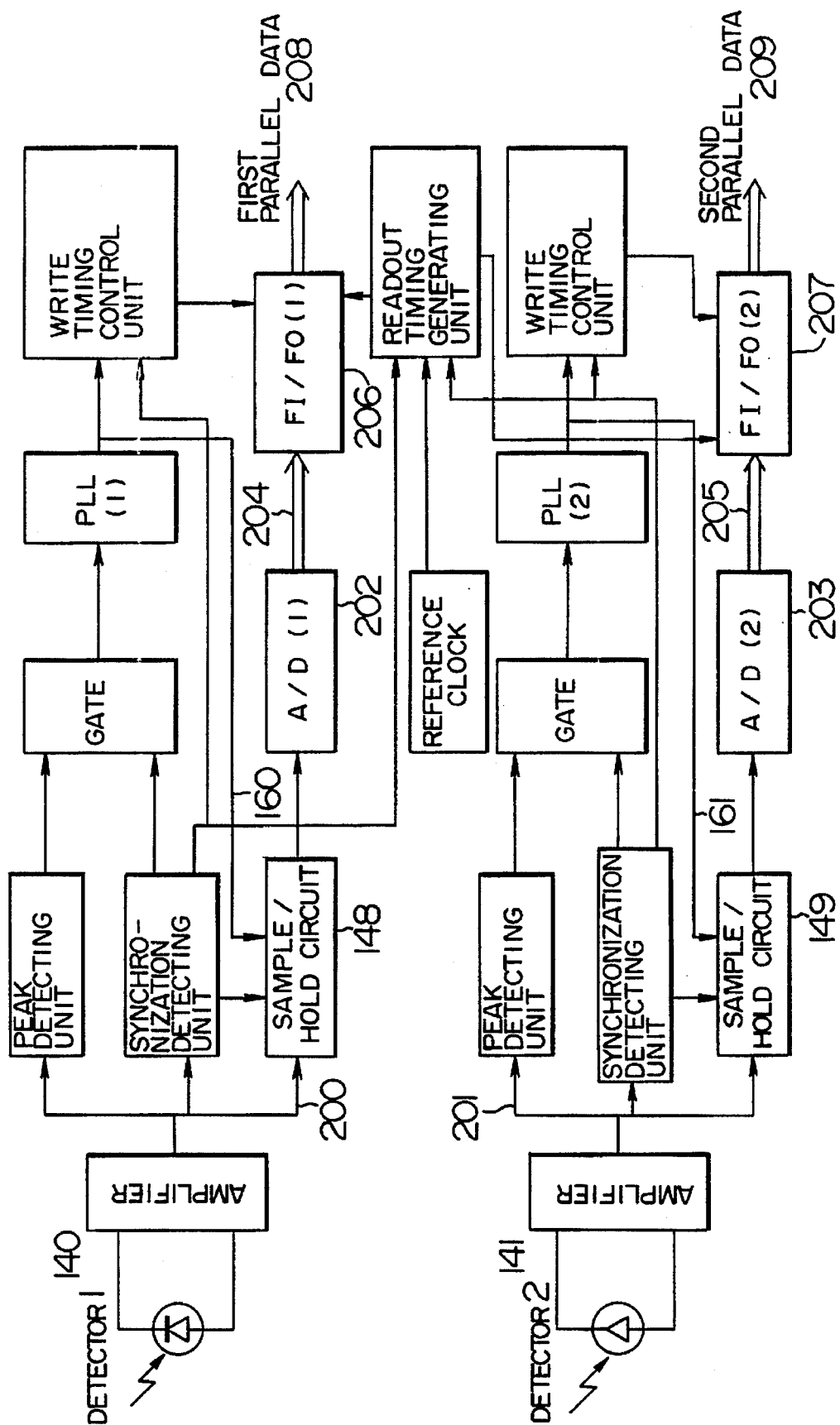
FIGS. 11 and 12 are schematic block diagrams for showing a reproduction processing system in case of strong crosstalk between one-dimensional arrangements.
Figure 12:
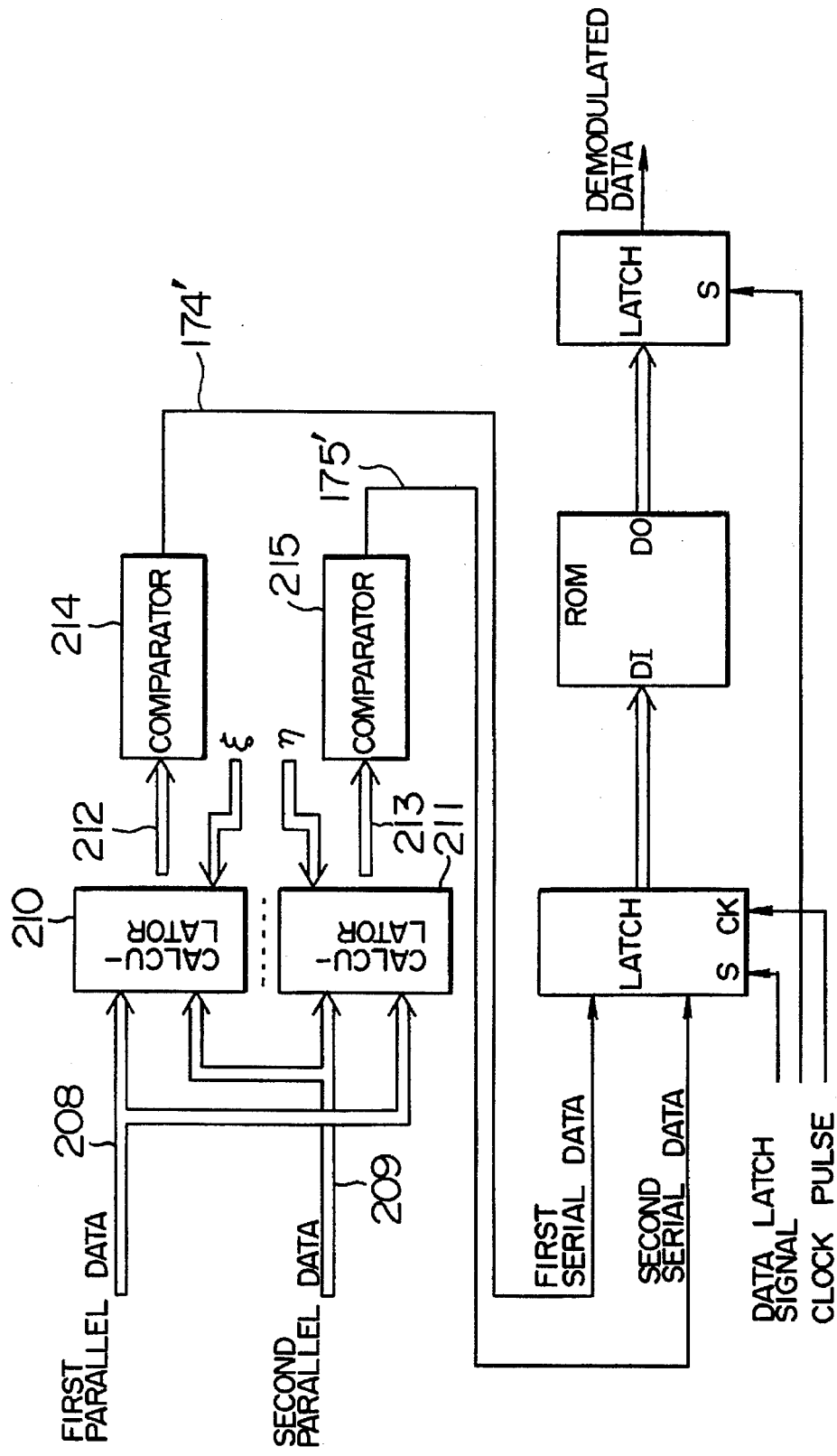

A concrete circuit arrangement for carrying out this calculation is shown in FIG. 11. It should be noted that the same reference numerals shown in FIG. 7 will be employed as those for denoting the same or similar circuit elements in FIG. 11. In this preferred embodiment, a signal to readily perform the calculation is A/D-converted and then digitally-processed. Signals 200 and 201 derived from detectors 140 and 141 are inputted into sample/hold circuits 148 and 149; levels of signals corresponding to the grid points are fetched with employment of the clocks 160 and 161 which have been formed in a similar manner to that of the preferred embodiment shown in FIG. 7; and then these signals are inputted into A/D converters 202 and 203 so as to be converted into digital signals 204 and 205. The digital signals are fetched into memory FI/FO (first-in/first-out) 206 and 207; the time shifts between two spots are corrected; and the digital values of the levels of the signals appearing at the same position on the radius of the disk are detected as first and second parallel data 208 and 209 every spots, as explained in FIG. 7. The data signals 208 and 209 are inputted into calculators 210 and 211, as shown in FIG. 12, and then a calculation corresponding to the above-described arithmetic formulae, whereby signals having no interference 212 and 213 are outputted. These signals are entered into comparators 214 and 215 so as to effect level comparisons, so that serial data 1, 217; 4', 175' are detected. The subsequent process is performed in a similar way to that of FIG. 8 and thus data 187 corresponding to the two-dimensionally arranged data is demodulated. As represented in FIG. 19, when the column in the vertical direction is increased to "q", a detection signal "Ip(t)" of a p-th column is given by:

$$Ip(t) = ip(t) + \xi i_{n-1}(t-\tau) + \eta i_{n+1}(t+\tau)$$

If this n-th order simultaneous equations are solved, the signals "ip" from the P-th column with no interference can be obtained. At this time, both (i–1) and (iq+1) are set to zero, where $0 \leq p \leq q$.

A further preferred embodiment will now be described with reference to FIG. 13A.

In the previous embodiment shown in FIG. 12, the coefficiencies "$\xi$" and "$\eta$" of interference must be supplied to calculators 210 and 211. These coefficients "$\xi$" and "$\eta$" are varied, depending upon the track shifts, shapes of spots and track pitches. An object of this preferred embodiment is to mitigate the adverse influences caused by these variation matters and to achieve more higher density.

That is to say, in accordance with this preferred embodiment, a comparison is performed in a relative level by calculating a difference between signals $I_1$ and $I_2$ obtained from two spots. Then, even when there is interference between the adjoining pits, the reliable data detection may be carried out. This method is expressed with employment of the above-described formulae as follows:

$$I_1(t-\tau) - I_2(t) = i_1(t-\tau) - i_2(t) + \eta i_2(t) - \xi i_1(t-\tau)$$

If the coefficient "$\eta$" is substantially equal to the coefficient "$\xi$", it becomes:

$$I_1(t-\tau) - I_2(t) = (1-\eta) \times [i_1(t-\tau) - i_2(t)]$$

This implies that there is only amplitude variation. With such a method, the difference among the signals having no interference may be stably detected by compensating for the variations with employment of AGC (auto gain control) circuit or the like. The difference signal owns ternary levels such as + level, 0 level and − level, depending on the pit arrangement. Assuming now that a signal processing system series for generating first parallel data 208 is selected to be $CH_1$, and a signal processing system series for generating second parallel data 209 is selected to be $CH_2$, when a difference is calculated between the first parallel data 208 and second parallel data 209, a relationship among the ternary levels and the data at the respective CHs is given as follows:

| $CH_1$ | $CH_2$ | level |
| --- | --- | --- |
| 1 | 0 | negative |
| 1 | 1 | zero |
| 0 | 0 | zero |
| 0 | 1 | positive |

A judgement can be made whether or not there are adjoining pits from this list. In other words, when the level becomes positive, there is the pit hole at the right side of the disk shown in FIG. 1, and there is no pit hole at the left side thereof. Conversely, when the level becomes negative, no pit hole is present at the right side of the disk but the pit hole is present at the left side thereof.

It should be noted that when the data from $CH_1$ is the same as the data from $CH_2$, the level becomes zero and thus no judgement is made whether the left and right pits are present or not. In this case, the levels of $CH_1$ and $CH_2$ are detected by employing other binary comparators 220 and 211. That is to say, both the output from the ternary comparator 222 and the outputs from the binary comparators 220 and 221 are inputted into a logic processing unit 223, and when the data from $CH_1$ is the same as the data from $CH_2$, a judgement is made by employing the values of the data from $CH_1$ and $CH_2$.

In case of a write once type medium, since the reflection light is reduced when there are the pits as obtained in the waveform simulation, the signals obtained from the portion where the pits are present are sampled in order to detect whether or not the pits exist, and the sampled signals are compared with a certain value. For instance it assumed that when the detected level is low, the pits exist, which corresponds to data of "1", whereas if the detected level is high, no pits exist which corresponds to data of "0".

When the data from $CH_1$ and $CH_2$ becomes 1, there are left and right pits adjoining to each other. When the data from $CH_1$ and $CH_2$ becomes 0, neither left pit or right pit is present.

This judgment result is outputted as first and second real data 174", 175" corresponding to the data obtained at the same radial positions of $CH_1$ and $CH_2$. The subsequent process is carried out in a similar manner to that of FIG. 12, and data corresponding to the two-dimensionally arranged data is demodulated therefrom.

The pit arrangements suitable for this detecting system will now be described with reference to FIG. 14. The right end of FIG. 14 represents the recorded patterns of the pit arrangement which have been described in the above-described preferred embodiment. It should be understood that although the recorded positions of two sets of one-dimensionally arranged data (centers of pit arrays are 300 and 301) at the right end are coincident with respect to the radius of the disk, the pits are positionally shifted in the pit arrangement (centers of pit arrays are 302 and 303) according to this preferred embodiment, and also the position where the data on one arrangement (a center of a pit array is 303) is recorded on the gap position between the previous blocks. With such an arrangement, the data of the respective one-dimensional arrangements are not overlapped with each other at the radial position of the disk even when any recording data are employed, and therefore there is no zero in the level difference between the data from $CH_1$ and $CH_2$.

Figure 13B:
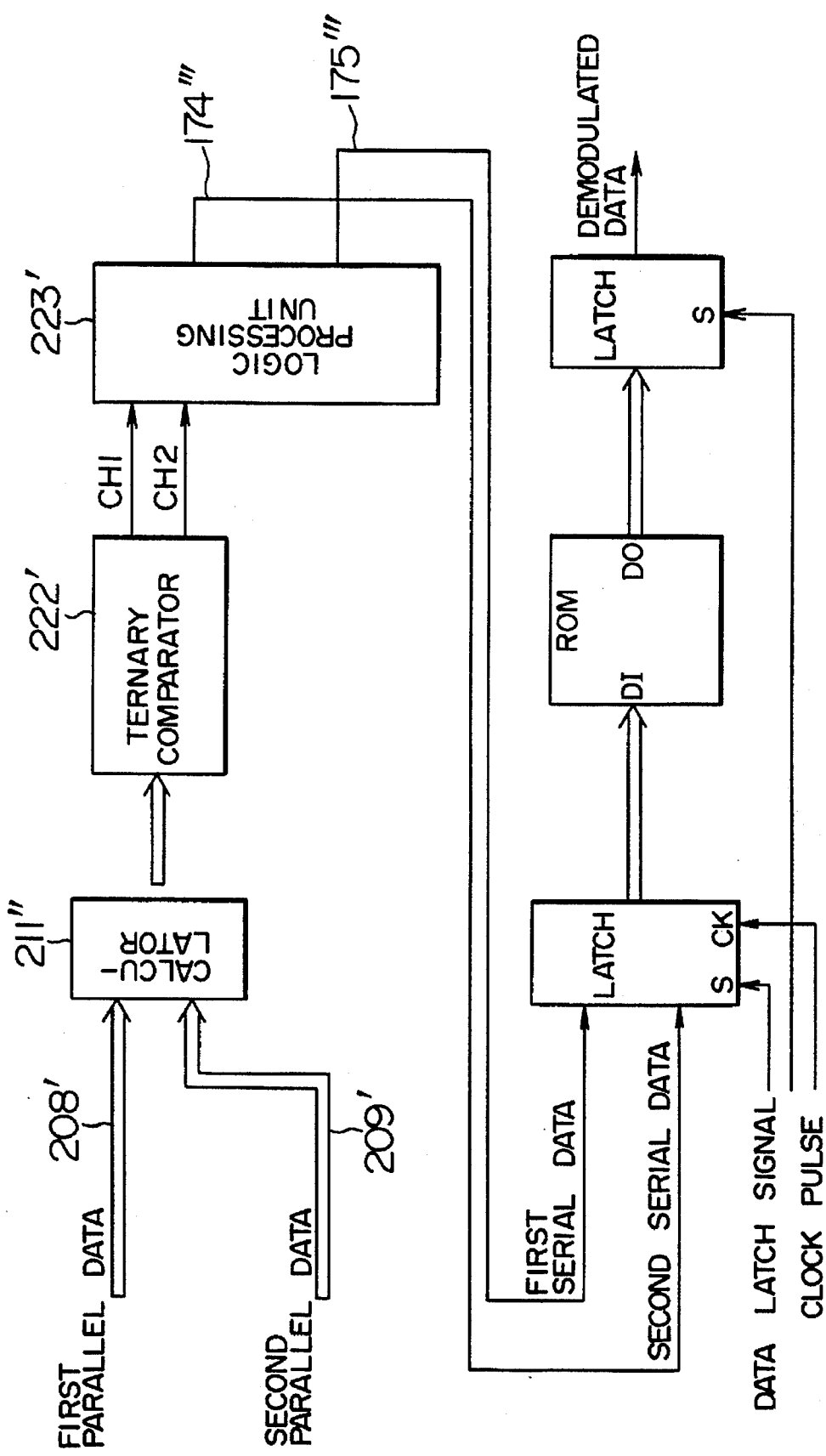

As a consequence, the signals of the respective one dimensional arrangements may be separately detected by merely calculating a difference between the data outputted from CH1 and CH2, so that no process for the zero level difference is longer required. It should be noted that when the signals of the respective one dimensional arrangements are detected, the timings of the clocks for the recording and reproducing operations are shifted with each other. However, there is no need to essentially modify the arrangements of the circuits which have been previously explained. Such a circuit arrangement is shown in FIG. 13B.

Furthermore, this method may be applied not only to data recording operation for the two dimensional arrangements, but also for the conventional one dimensional arrangement. That is to say, the convertional one-dimensionally arranged data are subdivided into two bits, and may be alternately recorded on $CH_1$ and $CH_2$. Also, completely independent one-dimensional arrangements may be alternately recorded on two series. Both the pit arrangements on the disk plane during the two-dimensional recording operation and the recorded/reproduced signal processing system have been so far described.

Figure 16A:
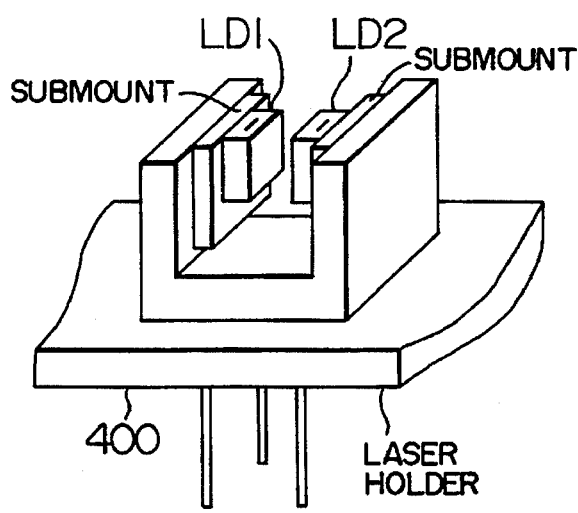
FIGS. 16A and 16B are constructive arrangement of an optical system for forming two spots.
Figure 16B:
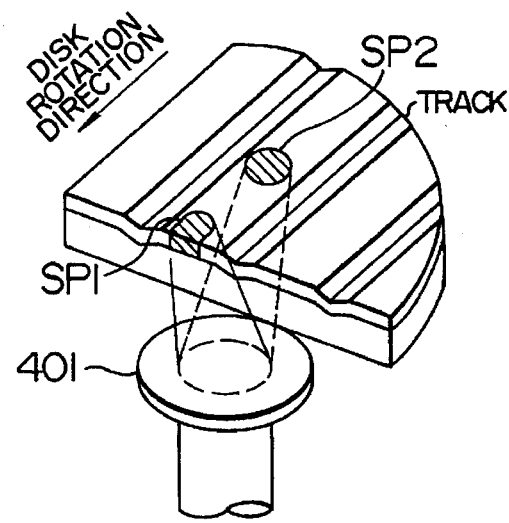

Next, an optical system and a spot control method for realizing these operations will now be described. FIGS. 16A and 16B illustrates an example for realizing two spots. This is the example with employment of a laser array 400 in which two laser chips functioning as a laser light source have been mounted in one package. As shown in FIG. 16A, such a semiconductor laser array is employed as the light source that active layers of two laser chips LD1 and LD2 having different wavelengths with each other are positioned opposite to each other and are mounted within a single package. The laser chip LD1 has a wavelength of 780 nm. The other laser chip LD2 has a wavelength of 830 nm. As represented in FIGS. 1 and 16B, the positional relationship between a light spot Sp1 (wavelength of 780 nm) and a light spot Sp2 (wavelength of 830 nm) which are formed by both of the laser light sources on the disk is as follows; these light spots Sp1 and Sp2 are positioned on the same track and the spot Sp2 is positioned with preceding the other spot Sp1, as shown in FIG. 1.

Figure 17A:
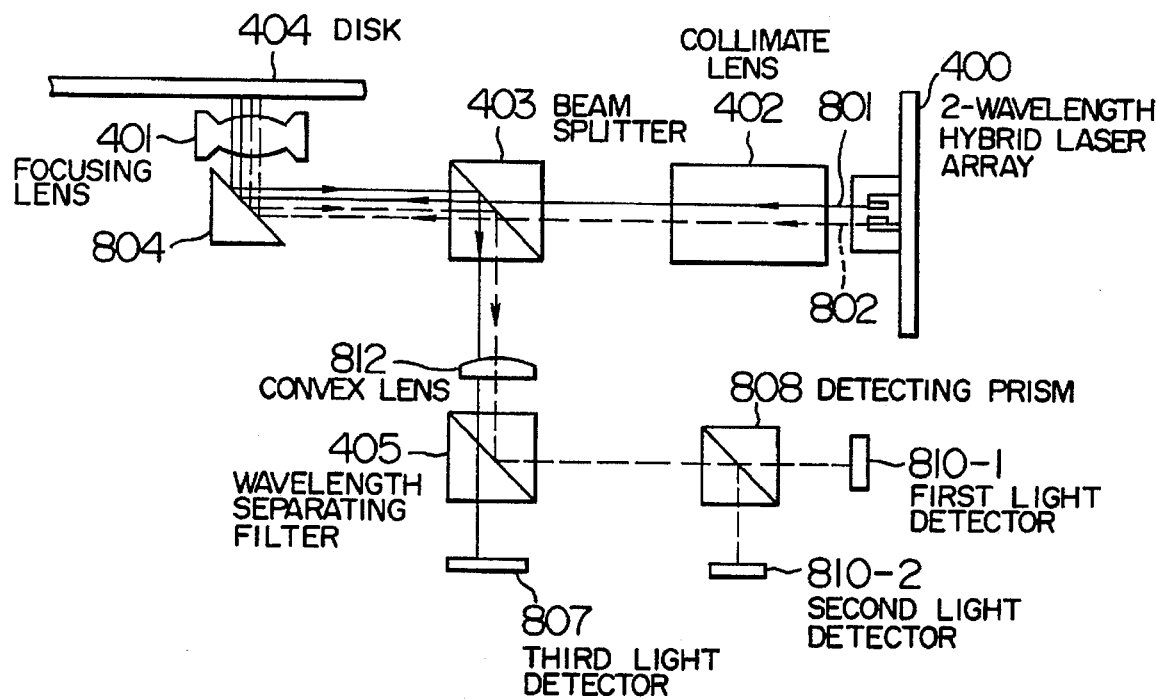
FIGS. 17A and 17B are schematic block diagrams for explaining a method for detecting a control signal derived from the optical system to form the two spots.

In FIG. 17A, there is shown a preferred embodiment related to a concrete construction of the optical head according to the present invention. This is such a preferred embodiment that a two-wavelength hybrid laser array 400 in which the laser chips having different wavelengths with each other are positioned opposite to each other and mounted within one package, as the semiconductor light source. Both a laser beam 801 (wavelength $\lambda_1$=830 nm) and a laser beam 802 (wavelength $\lambda_2$=780 nm) irradiated from the two-wavelength hybrid laser array 400 become substantially parallel laser beams in a collimate lens 402.

The two laser beams are incident upon a beam splitter lens 403 as an p-polarized light. These laser beams are returned along the light path at a mirror 804 and focused on the disk 404 by a focusing lens 401. Two laser beams reflected from the disk 404 are further reflected by a beam splitter 403, and then pass through a convex lens 812 and thereafter reach a wavelength separating filter 405. The wavelength separating filter 405 causes the laser beam 801 having the wavelength of 830 nm to pass therethrough, and the laser beam 802 having the wavelength of 780 nm to be reflected therefrom. The laser beam 802 reflected from the wavelength separating filter 405 is conducted to a detecting optical system with employment of a detecting prism 808, and received by a first light detector 810-1 and a second light detector 810-2, which constitute a detector for detecting differential focusing shifts. From the first light detector 810-1, a data signal, an address signal, a focus error signal and a tracking error signal. On the other hand, the laser beam 801 which has passed through the wavelength separating filter 405 is received by a third light detector 807. From the third light detector 807, a data signal, an address signal and a tracking signal are obtained.

The focusing lens 401 is mounted on a focusing lens actuator (not shown). As this focusing lens actuator, a so-called "two-dimensional actuator" for moving the focusing lens both in a vertical vibration direction of the disk and in a track shift direction, may be employed, or another actuator for moving the focusing lens only in the vertical vibration direction. Furthermore, although the prism is shown as the rising mirror 804 in FIG. 17A, a so-termed "galvanomirror" may be similarly utilized.

Figure 17B:
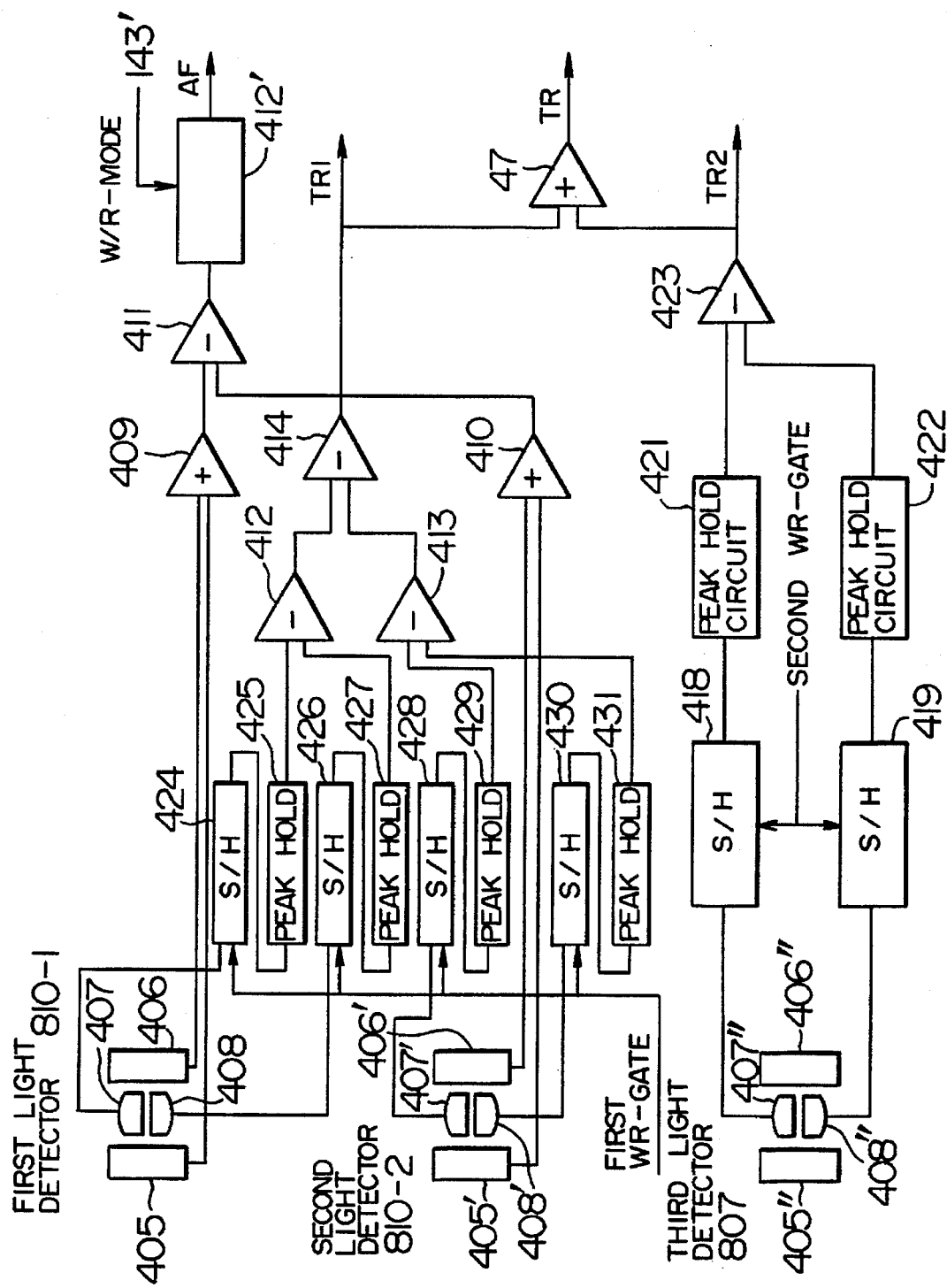

Next, the detecting prism optical system will now be described with reference to FIG. 17B. As represented in this figure, light receiving planes of the respective detectors are subdivided into four planes. The output signals derived from each of two light receivers 405, 406, 405', 406' at left and right sides of the first and second detectors are summed up by the respective differential amplifiers 409 and 410, and the output signals from the detectors are subtracted from each other by the differential amplifier 411, whereby a focus error signal "AF" is detected. A track error signal "TR1" is obtained in such a manner that the output signals from the light receivers 407, 408, 407' and 408' positioned at the upper and lower positions of the first and second detectors are subtracted from each other by the differential amplifiers 409 and 410, and also the output signals from these detector are subtracted with each other by the differential amplifier 414. Since a detailed description of the above-described error signal detections has been described in JP-A-63-146237, the description is omitted. The data signal and a prepit signal from the pits which are present at a side read out by the laser beam having the wavelength "$\lambda_2$" are detected from the summation of the output signals derived from the respective light receiving planes of the first and second light detectors. Furthermore, the third light detector 807 has a similar shape to that of the above-described light detector, as represented in FIG. 17B, a tracking signal TR2 is detected from a subtraction between the output signals from the upper and lower light receivers 407" and 408", and also a data signal from a pit positioned at a side read out by the laser beam having the wavelength of "$\lambda_1$" is detected from another summation of the output signals derived from the respective light receives of this third light detector.

It should be noted that since the above explanation is made of such a case that a write once type medium is employed as the recording film, the strengths of reflection light are utilized so as to read the information of the pits. When an opto-magnetic recording film is employed as the recording film, information of domains may be read with employment of polarized light of reflection light.

A method for processing control signals during recording/reproducing operations will now be described.

To achieve a light spot control, both a track error detection and a focus error detection are required. The following description is given to such a case where a write once type medium is employed as the recording film. This is because the data does not give any influence to the detection of the tracking control signals when an opto-magnetic recording film is utilized and thus the following signal process is not specifically required. Also, the focus error detection may be performed by merely detecting the low frequency component of the reflection light during the recording/reproducing operations, since there is less problem such as gain variations and offset matter, as compared with the track error detection. In concrete operation, amplifier 412 having a low frequency characteristic is utilized so as to accept an increase in the level of reflection light during the recording operation, as compared with the level of reflection light during the reproducing operation by changing the gains of this amplifier 412' in response to a signal W/R-MODE 413' indicative of the recording/reproducing mode. A tracking control-signal implies a track error signal. When the recording operation is performed with employment of the spots indicated by the inclined lines of FIG. 1, the tracking control signal of the light spot from the succeeding spot is influenced by receiving the influence caused by the pit recorded by way of the preceding spot. In an additionally recording type film, an amount of reflection light from a through hole type data pit is reduced, and there are some cases that detection sensitivities of the tracking control signal will be lowered, or an offset will occur. In accordance with this preferred embodiment, in order not to be influenced by the recorded pits, such a fact that no recorded pit is present between the blocks is utilized and the tracking control signal is detected only from this portion where no recorded pit exists. As this method, since the level of reflection light becomes great at the portion where no recorded pit is present, the output signal corresponding to such a high level of reflection light, among the output signals from the light receiver for detecting the tracking control signals, is selectively detected. Since it is only a portion of block where the recording power becomes high during the recording operation, and also it is known the recording, timings, the value of the detection signal immediately before the emission of the recording pulse is sampled/held. During the reproducing operation, the output signal corresponding to the high level of reflection light among the output signals derived from the light receivers for detecting the control signals with respect to both the preceding spot and succeeding spot, is selectively detected.

Referring now to FIG. 17B, a circuit arrangement for performing the above-described signal process will be described. Outputs from the respective light receivers 407, 408, 407', 408', 407" and 408" are inputted into sample/hold circuits 424, 426, 428, 430, 418 and 419, and then held for the recording period by employing first and second gate signals WR-GATE 420 and 432 which have been formed from the respective recording pulses. Outputs from the sample/hold circuits are inputted into peak hold circuits 421, 422, 425, 427, 429 and 431 so as to continuously detect the outputs where the signal levels are high. After these signal processing operations, differences among the output signals from the respective light receivers and calculated by the differential amplifiers 412, 413, 414 and 423. Although the analog signal processing operation was performed in this preferred embodiment, alternatively after the outputs from the light receivers are A/D-(analog-to-digital) converted, the resultant digital signals may be processed by the sample hold and peak detecting operations.

It must be such a signal as the track error signal TR that the positions of the preceding spot and the succeeding spot are positioned so as to be separated from a track center to both sides by equal distances. To detect such a signal, the track error signal TR1 from the preceding spot is summed with the track error signal TR2 from the succeeding spot. Assuming now that positional shifts of the spot are "$\alpha$" and "$\beta$"; a track pitch is "p"; a detected amplitude is "A"; and a variable of the spot positional shift is "X", the track error signals derived from the respective spots are expressed as follows:

$$A\sin\left[\frac{2\pi}{p}X-\alpha\right]$$

$$A\sin\left[\frac{2\pi}{p}X+\beta\right]$$

When these shift signals are summed with each other, it becomes:

$$2A\sin\left[\frac{2\pi}{p}X+\frac{\beta-\alpha}{2}\right]\times\cos\left[\frac{\beta+\alpha}{2}\right]$$

A position of a zero point of the detected signal TR is coincident with a center of each of the spots. When this signal is used, the position of the preceding spot is position in such a manner that this position is separated from the position of the succeeding spot by the equal distances with respect to the track center.

Although the examples of the optical disks have been described in the above-described preferred embodiments, the present invention may be applied to optical information recording/reproducing mediums such as an optical drum and an optical card. Also, the present invention may be applied not only to the recording/reproducing apparatuses, but also to the recording apparatus, or reproducing apparatus. Furthermore, the present invention may be applied to an optomagnetic recording film, instead of the write once type film employed in the above preferred embodiments.

The recording system according to the present invention is preferably applied to either the CLV (constant linear density) recording system, or the MCAV (modified constant linear density) recording system which have been used as the data recording system for the optical disk. That is to say, since the pit densities of these systems at the radial recording positions of the optical disk are substantially equal to each other, when the spot intervals along the track traveling direction are constant and these spot intervals are not changed, depending upon the radial positions of the optical disk, as in the present recording system, the number of pits entered in the intervals is not essentially changed, depending upon the recording radial positions. As a result, both the number of shift registers 120 shown in FIG. 5 and also the capacity of the first-in/first-out memory for correcting the timing shifts produced during the reproducing operation, as represented in FIG. 7, may be set to constant values, irrelevant to the recording radius. It should be noted that in case of CLV recording system, the clock pulse shown in FIG. 5 and also the reference clock produced from the reference clock generating circuit 181 shown in FIG. 7 may be set to constants, irrelevant to the recording radius. However, the above-described clock must be varied depending upon the radial positions of the disk in case of MCAV recording system. To this end, in order to detect the radial positions of the disk, marks are previously recorded on this disk by which the radial positions can be optically discriminated, the radial positions are recognized by using the marks, and the clock frequency is set to a predetermined clock frequency. Also, there is another method that the position of the recording/reproducing head is read out by a scale present at another position different from the first-mentioned position, and then the clock frequency is set to a predetermined clock frequency.

While the particular embodiments of the present invention have been shown and described, it will be obvious to those skilled in the are that various changes and modifications may be made without departing from the present invention in its broader aspects.

What is claimed is:

1. A recording/reproducing apparatus wherein continuous data is converted into data blocks each arranged in a form of n rows×m columns of two dimensional matrix data (n and m being positive integers) and the data blocks are recorded on tracks of an optical recording medium in a two-dimensional arrangement according to the matrix data with controlled light spots from a plurality of m laser light sources, the continuous data being reproduced by detecting reflected light spots from the tracks by using the plurality of m laser light sources, the apparatus comprising an optical system for producing on the optical recording medium m light spots from the m laser light sources, each of the light spots having a diameter of Ws, and a distance L between adjacent light spots along a direction perpendicular to a light spot scanning direction, and a track pitch p between adjacent tracks along a direction perpendicular to the light spot scanning direction on the optical medium being arranged so as to satisfy a relationship with the distance L and the light spot diameter Ws of $p \geq L + Ws$.

2. A recording/reproducing apparatus wherein continuous data is converted into data blocks each arranged in a form of n rows×m columns of two dimensional matrix data (n and m being positive integers) and the data blocks are recorded on a track of an optical recording medium as pits in a two-dimensional arrangement according to the matrix data with controlled light spots from a plurality of laser light sources, the continuous data being reproduced by detecting reflected light spots from the track by using the plurality of laser light sources, the apparatus comprising a two-dimensional data generating means for generating the data blocks wherein a distance between an outermost pit of one data block and an adjacent pit of an adjacent data block along a light spot scanning direction is at least greater than a value determined Ws/2+W/2, where Ws is a diameter of the light spot and W is a size of a pit.

\* \* \* \* \*